Dec. 19, 1967  S. R. McCUTCHEON  3,359,491
SIGNAL WAVEFORM CHARACTERISTIC MEASURING SYSTEM
HAVING STOP-START LOGIC CIRCUIT
Filed June 15, 1962  5 Sheets-Sheet 1

INVENTOR.
SAMUEL R. McCUTCHEON
BY
BUCKHORN, CHEATHAM & BLORE
ATTORNEYS

INVENTOR.
SAMUEL R. McCUTCHEON
BY
BUCKHORN, CHEATHAM & BLORE
ATTORNEYS

Dec. 19, 1967 S. R. McCUTCHEON 3,359,491
SIGNAL WAVEFORM CHARACTERISTIC MEASURING SYSTEM
HAVING STOP-START LOGIC CIRCUIT
Filed June 15, 1962 5 Sheets-Sheet 4

INVENTOR.
SAMUEL R. McCUTCHEON
BY
BUCKHORN, CHEATHAM & BLORE
ATTORNEYS

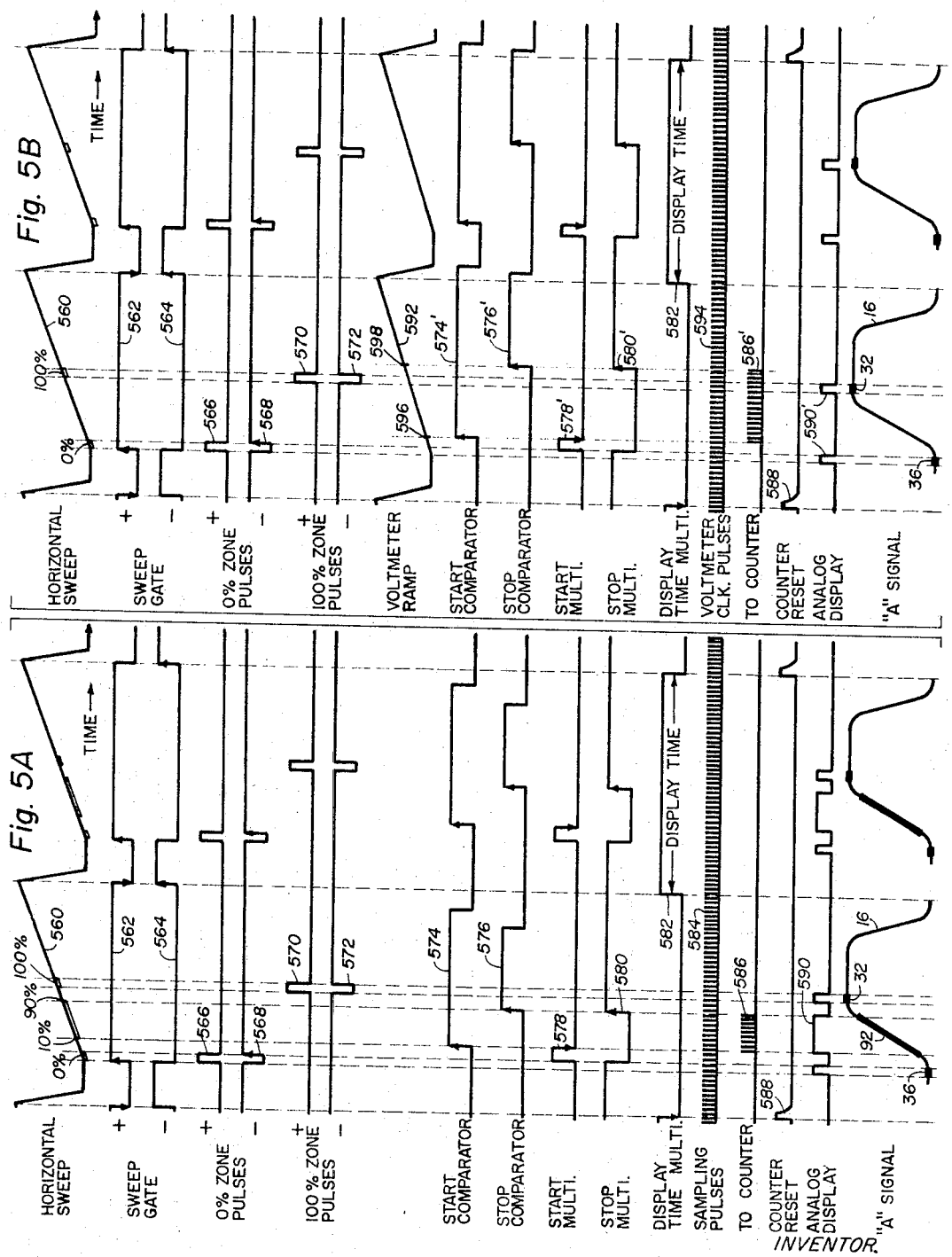

United States Patent Office 3,359,491
Patented Dec. 19, 1967

3,359,491
SIGNAL WAVEFORM CHARACTERISTIC MEASURING SYSTEM HAVING STOP-START LOGIC CIRCUIT
Samuel R. McCutcheon, Aloha, Oreg., assignor to Tektronix, Inc., Beaverton, Oreg., a corporation of Oregon
Filed June 15, 1962, Ser. No. 202,814
17 Claims. (Cl. 324—68)

The subject matter of the present invention relates generally to electrical circuits for measuring the characteristics of electrical signal waveforms, and in particular to a start-stop logic circuit for measuring the time or voltage between two selected points on the electrical signal waveforms under investigation.

The start-stop logic circuit of the present invention is especially useful when employed as part of a cathode ray oscilloscope to determine the characteristics of the electrical signal waveforms displayed on the fluorescent screen of the cathode ray tube in such oscilloscope. Conventional cathode ray oscilloscopes display the electrical signal under investigation on an illuminated graticule scale which is usually positioned over the fluorescent screen of such oscilloscope. In order to determine the time or voltage between selected points on such waveforms it is necessary for the operator to count the number of 1-centimeter graticule lines between such points and then to multiply this by setting on the time per cm. sweep rate control for the horizontal sweep generator in the case of time measurements, or by the setting on the volt per cm. amplitude control of the vertical preamplifier in the case of voltage measurements. However, this is a laborious process which takes considerable time and is subject to human error since it requires reading the distance accurately on the graticule scale which is usually only divided into centimeters with 2-millimeter markers on the centerlines, reading the correct control setting and performing the proper multiplication process correctly. In addition, the graticule scale is often positioned outside the cathode ray tube envelope so that such graticule is spaced from the fluorescent screen of such tube by the glass face plate of such envelope. As a result of this spacing a parallax error is introduced when the above distance readings are made from the graticule of the waveform image on the fluorescent screen. The logic circuit of the present invention eliminates these disadvantages when employed with a cathode ray oscilloscope by providing an oscilloscope which automatically "reads out" the correct time and voltage characteristics of the waveforms under investigation in a fast and accurate manner. The read-out oscilloscope may be a dual trace oscilloscope which presents two waveforms on the fluorescent screen of the cathode ray tube in such oscilloscope so that the time relationship between these two waveforms may be measured as well as the time and voltage characteristics of each of such waveforms.

The logic circuit of the invention may include an electrical pulse counter circuit, such as that shown in copending U.S. patent application, Ser. No. 133,813, entitled, Pulse Counter, filed Aug. 25, 1961, by John R. Kobbe and Samuel R. McCutcheon, now U.S. Patent 3,219,801, which employs a plurality of gaseous glow indicator tubes and several associated identical digital decade counter circuits for counting and indicating a number of pulses having several significant figures. Another indicator tube may be provided to label the number recorded on the counter indicator tubes in terms of time or voltage. Also, the oscilloscope using the logic circuit of the present invention may be a sampling type of cathode ray oscilloscope so that the high frequency signal waveforms displayed on the fluorescent screen of such oscilloscope are sample waveforms made up of different portions or samples of successive repetitive signals. Certain circuits of one such sampling oscilloscope are disclosed in greater detail in copending U.S. patent application Ser. No. 131,647, entitled Pulse Generator Circuit filed on Aug. 15, 1961, by John V. Rogers, now U.S. Patent 3,214,607.

In addition to the automatic read-out for the pulse counter circuit discussed above, the stop-start logic circuit of the present invention also provides intensified zones of increased brightness on the light images of the signal waveforms displayed upon the fluorescent screen of the oscilloscope. A 0% zone and a 100% zone are employed for each of the two signal trace waveforms on such fluorescent screen and at least the 100% zone is movable along each waveform to change its position on such waveform in order to indicate what voltage or time measurements are being performed in a manner hereafter described. Another intensified portion of the waveforms may be provided between a start point and a stop point on such waveforms to indicate the start-stop region over which the time or voltage measurements of the counter circuit are being taken. These intensified regions on the signal trace waveforms enable the operator of the oscilloscope to quickly and accurately perform the voltage and time measurements required and to check on the fluorescent screen of such oscilloscope the number answer given by the indicator tubes of the counter circuit to make sure that such answer represents the correct portion of the waveform under investigation.

Briefly, one embodiment of the start-stop logic circuit of the present invention includes circuit for generating a start signal and a stop signal related to two different portions of an electrical signal waveform displayed on the fluorescent screen of the cathode ray oscilloscope in combination with a circuit for applying such start and stop signals to the cathode ray tube of such oscilloscope in order to increase the brightness of the light image of these portions of such waveforms, and a provision for varying at least one of said start and stop signals in order to move the brightened portions of the waveforms to any desired position on such waveforms. The start-stop logic circuit may also include a circuit for generating standard signal pulses and relating the number of such standard signal pulses to a characteristic of the waveforms under investigation, in combination with a circuit for counting the number of such standard pulses which are generated during the time period existing between the start portion and the stop portion of such waveforms in order to measure such characteristic in the region between such portions of the waveforms.

It is therefore one of the objects of the present invention to provide an improved electrical circuit for measuring the characteristics of electrical signal waveforms.

Another object of the present invention is to provide an electrical circuit which will quickly and accurately measure the time and voltage characteristics of an electrical signal waveform.

A further object of the present invention is to provide an electrical circuit which will automatically measure and indicate the voltage or time between two points on signal waveform displayed on the fluorescent screen of a cathode ray oscilloscope.

Still another object of the present invention is to provide a logic circuit for visually indicating on the fluorescent screen of a cathode ray oscilloscope a start point and a stop point of a signal trace waveform displayed by such oscilloscope, and for automatically determining the time or voltage characteristics of such waveform between such points by means of a pulse counter circuit in such logic circuit.

A still further object of the present invention is to provide an improved stop-start logic circuit which is extremely versatile in that it can automatically perform a plurality of different measurements as to the characteristics of electrical signal waveforms in a fast and accurate manner merely by changing the position of switches in said circuit.

An additional object of the present invention is to provide an improved hybrid multivibrator circuit employing a transistor and a vacuum tube connected so that such multivibrator must remain in one stable state of conduction for a predetermined controllable time before it can be triggered out of said stable state.

Still another object of the present invention is to provide an improved noise suppressor circuit which employs a plurality of standard positive and negative voltage pulses to charge a storage capacitor through a pair of gating devices which are opened and closed in response to an input signal, so that a stairstep voltage is formed on such capacitor which causes an output signal to be produced when such input signal changes polarity and eliminates any time jitter in such output signal due to noise in such input signal.

Other objects and advantages of the present invention will be apparent from the following detailed description of a preferred embodiment thereof shown in the attached drawings of which:

FIGS. 5A and 5B are graphs showing signal and control waveforms associated with the electrical circuits of FIG. 1.

Figure 1:
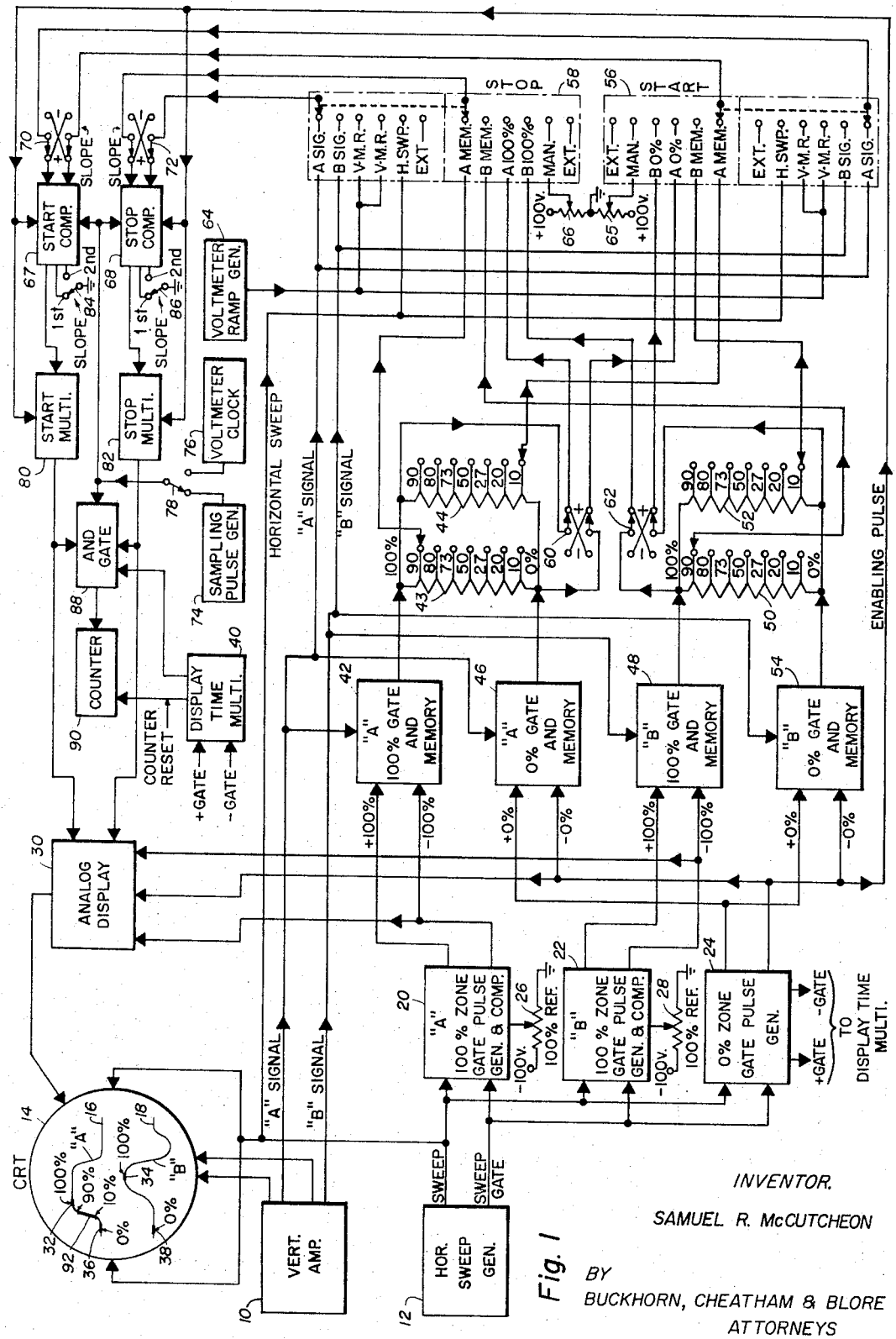
FIG. 1 is a schematic block diagram of the stop-start logic circuit of the present invention.

One embodiment of the stop-start logic circuit of the present invention is shown in the block diagram of FIG. 1 to include a vertical amplifier circuit 10 and a horizontal sweep generator circuit 12 similar to that found in a conventional cathode ray oscilloscope or in a sampling oscilloscope like that of application Ser. No. 131,647 referred to above. Such a horizontal sweep voltage is indicated at the top of FIGS. 5A and 5B. As has previously been mentioned, the oscilloscope employing the stop-start logic circuit of the present invention may be a duel trace type oscilloscope so that the vertical amplifier 10 indicated in FIG. 1 may provide two different vertical deflection signals designated "A" signal and "B" signal. These vertical signals are applied alternately to the vertical deflection plates of cathode ray tube 14, along with the horizontal sweep signal produced by the horizontal sweep generator 12 which is applied to the horizontal deflection plates of the tube to produce an "A" signal trace 16 and a "B" signal trace 18 on the fluorescent screen of such tube which are the light images of the "A" signal and "B" signal waveforms. The "A" and "B" trace waveforms, 16 and 18, may be in the form of "sample" waveforms which are composed of different sampled portions from the successive waveforms of a repetitive signal when the vertical amplifier is that used in a sampling type of cathode ray oscilloscope.

The "A" trace is also shown at the bottom of FIGS. 5A and 5B as the "A" signal. In addition to the horizontal sweep signal, the sweep generator 12 indicated on FIG. 1 also produces a sweep gate signal of the type shown near the top of FIGS. 5A and 5B. Both of these signals are transmitted to an "A" 100% zone gate pulse generator and comparator circuit 20, and to a "B" 100% zone gate pulse generator and comparator circuit 22. They are also transmitted to a 0% zone gate pulse generator 24. The 100% zone pulse generator and comparator circuits 20 and 22 each having a variable reference voltage supplied by the movable contacts of variable resistance potentiometers 26 and 28 respectively, which have one end connected to a source of −100 volts reference voltage and the other end connected to ground. The 100% zone pulse generators generate "A" and "B" 100% zone pulses, also indicated on FIGS. 5A and 5B, when the horizontal sweep voltage equals the corresponding reference voltage and it is thus the setting of the reference voltage potentiometers 26 and 28 which determine when the "A" and "B" 100% zone pulses are generated with respect to the start of the voltage ramp of the horizontal sweep signal. Each of the 100% zone pulse generator and comparator circuits 20 and 22 indicated on FIG. 1 produces a +100% pulse and a −100% pulse. The "A" −100% zone pulse from the "A" 100% pulse generator 20 is transmitted to an analog display circuit 30 and applied to the control grid of the cathode ray 14 at the proper time so that it appears as an intensified zone 32 of increased brightness on the "A" trace waveform 16. Likewise, the "B" −100% zone pulse produced by the "B" 100% pulse generator 22 is transmitted through analog display circuit 30 to the control grid of tube 14 so that it appears as an intensified zone 34 on the "B" trace waveform 18.

The horizontal sweep signal and the sweep gate signal produced by the horizontal sweep generator 12 are also transmitted to the 0% zone pulse generator 24 and utilized in such generator to produce a pair of + and −0% zone pulses, also indicated on FIGS. 5A and 5B, which are related in time to the start of the ramp voltage of the horizontal sweep signal. As indicated on FIG. 1, the 0% zone pulse is transmitted through the analog display circuit 30 to the control grid of cathode ray tube 14 so that it appears as two intensified zones 36 and 38 on the "A" trace waveform 16 and the "B" trace waveform 18, respectively. It should be noted that, while the 100% intensified zones 32 and 34 may be moved along the waveforms 16 and 18 by varying the setting of potentiometers 26 and 28 to occur at any position on such waveform, this is not true of the 0% intensified zones 36 and 38 since they correspond to the start of the voltage ramp of the horizontal sweep signal. However, it is possible to supply the 0% zone pulse generator 24 with a potentiometer and reference voltage also so that the 0% zones 36 and 38 could also be moved, and also to provide two of such 0% zone pulse generators so that these 0% intensified zones 36 and 38 could be moved independently of each other if desired. In addition to produce the + and − 0% pulses the 0% pulse generator 24 also inverts the sweep gate signal so that it produces + and − sweep gate signals which are transmitted to a display time multivibrator 40 to trigger such multivibrator on and off.

The + and − 100% pulses from the "A" 100% pulse generator 20 are transmitted to an "A" 100% gate and memory circuit 42 along with the "A" signal to produce an "A" 100% memory voltage which is related in amplitude to that portion of the "A" signal which occurs at the time of the "A" 100% pulses. This "A" 100% memory voltage is applied to one end of a pair of parallel connected step variable potentiometers 43 and 44. The + and − 0% pulses from the 0% pulse generator 24 are transmitted to an "A" 0% gate and memory circuit 46 along with the "A" signal in order to produce an "A" 0% memory voltage which corresponds to the voltage of that portion of the "A" signal which occurs at the time of the 0% pulses. This "A" 0% memory voltage is applied to the other ends of the potentiometer 43 and 44. In a similar manner the + and − 100% pulses from the "B" 100% pulse generator 22 are transmitted to a "B" 100% gate and memory circuit 48 along with the "B" signal to produce a 100% memory voltage which is applied to one end of a pair of parallel connected step potentiometers 50 and 52. Also, the + and − 0% pulses from the 0% pulse generator 24 are transmitted to a "B" 0% gate and memory circuit 54 along with the "B" signal in order to produce a "B" 0% memory voltage which is applied to the other end of the potentiometers 50 and 52. It should be noted that only one potentiometer could be used in place of each pair of memory potentiometers 43, 44 and 50, 52 if two movable contacts are provided on such one potentiometer.

Each of the step potentiometers 42, 44, 50 and 52, has movable contact terminal positions corresponding to 10%, 20%, 27%, 50%, 73%, 80% and 90% of the reference voltage between the 0% memory voltage and the 100% memory voltages. The movable contact of each of these potentiometers is connected to one of two switches including a start switch 56 and a stop switch 58. Thus, the movable contact of potentiometer 43 is connected to the "A" memory voltage terminal of stop switch 58 designated "A MEM." while the movable contact of potentiometer 44 is connected to the "B" memory voltage terminal on start switch 56 designated "B MEM." In a similar manner, the movable contact of potentiometer 50 is connected to the "B" memory voltage terminal on the stop switch 58 and the movable contact of potentiometer 52 is connected to the "B" memory voltage terminal on the start switch 56. Since these movable contacts of the memory voltage potentiometers may be switched between any of the 10% to 90% steps of such potentiometers, any of the reference voltages corresponding to these steps may be applied to the stop and start switches. In addition, the "A" 0% and 100% reference voltages and the "B" 0% and 100% reference voltages may be applied to the start and stop switches through reversing switches 60 and 62 which in the normal "+" position shown transmit the 100% memory voltages to the stop switch and the 0% memory voltages to the start switch. In the "−" position of the reversing switches 60 and 62 the 0% memory voltage and the 100% memory voltage are reversed in that the "A" and "B" 0% memory voltages are applied to the stop switch 58 while the "A" and "B" 100% memory voltages are applied to the start switch 56.

The stop switch 58 and the start switch 56 are each in the form of a dual switch with two ganged movable switch contacts and provide a selector means for enabling either time or voltage measurements. Each movable switch contact may be moved into six different switch positions in order to transmit a different output signal from the swtich to the comparator circuits hereafter discussed. Thus the "A" signal and the "B" signal generated in vertical amplifier 10 are transmitted to an "A SIG." terminal and a "B SIG." terminal, respectively, on the stop switch 58 and the start switch 56. When the start switch 56 is positioned so that one of its contacts is on the "A MEM." terminal the other of its contacts is on the "A SIG." terminal, and likewise when one of its contacts is moved to the "B MEM." terminal the other of its contacts is on the "B SIG." terminal, since these switch contacts are ganged together. However, when one of the switch contacts on the start switch 56 is switched to the "A 100%" terminal the other of such switch contacts is swiched to a terminal labeled "V-M.R." which connects it to a voltmeter ramp generator 64 which produces a standard ramp voltage signal shown as the "Voltmeter Ramp" on FIG. 5B. Such ramp has a predetermined rate of increase so that the voltage of such ramp signal is linearly related to time. This voltmeter ramp generator of FIG. 1 is also connected to the stop switch 58 at the two switch terminals designated "V-M.R.". Thus, when the start switch has one movable contact in the "A 0%" position, its other contact is in the voltmeter ramp "V-M.R." position and when it has one of its contacts in the "B 0%" position its other contact is also in the voltmeter ramp position. Likewise, the stop switch 58 is ganged so that when one of its switch contacts is in the "A 100%" position, its other switch contact is in the voltmeter ramp position

"V-M.R."

and when one of its switch contacts is in the "B 100%" it has its other switch contacts in another voltmeter ramp position. The two switch positions on the start and stop switches 56 and 58 corresponding to the terminals "A MEM." and "B MEM." along with their related terminals "A SIG." and "B SIG." are used for measuring the time characteristic of the "A" and 'B' trace waveforms 16 and 18. However, the two switch positions on the start and stop switches related to the "V-M.R." terminals and the corresponding "A 0%," "B 0%," "A 100%," and "B 100%" terminals are employed to measure the voltage of such waveforms.

The functions of the remaining two switch positions of switches 56 and 58 corresponding to terminals "H.SWP.," "MAN." and "EXT." remain to be discussed. One terminal on each of the switches 56 and 58 designated "H.SWP." is connected to the horizontal sweep signal generator 12 so that the horizontal sweep voltage is supplied to such terminal and the corresponding terminal designated "MAN" of each switch is connected to a manually positioned reference voltage by a movable contact of a potentiometer 65 and 66, respectively, each of which is connected between +100 volts D.C. and ground. These manual control potentiometers 65 and 66 allow the start and the stop points on the "A" trace and "B" trace waveforms 16 and 18 to be moved to any position on such waveforms so as to not be limited to the percent step switch positions of potentiometers 43, 44, 50 and 52. The remaining "EXT." terminals on the start and stop switches are connected to connectors for external circuits so that the input to these switches may be any desired signals from such external circuits.

The outputs from the start and stop switches 56 and 58 are connected to a start comparator circuit 67 and a stop comparator circuit 68, respectively, through plus or minus slope switches 70 and 72, respectively. In the start comparator and stop comparators a rapidly varying voltage such as the "A" signal or "B" signal, voltmeter ramp or horizontal sweep voltage is compared with a slower varying or adjustable voltage such as the "A" or "B" memory voltages or "A" or "B" 0% and 100% zone voltages or the manually adjustable voltage from the potentiometers 65 and 66. Whenever the rapidly varying voltage becomes equal to or reaches a value which is a predetermined ratio to the slower varying voltage, a trigger signal from the start comparator or stop comparator, as the case may be, is produced. Such signals are indicated on FIGS. 5A and 5B as abrupt increases in the voltages from the start and stop comparators. The start and stop comparators 67 and 68 are also connected to either a sampling pulse generator 74 or a voltmeter clock 76 by means of a selector switch 78 so that the pulses generated in such sampling pulse generator or such voltmeter clock are transmitted to the comparators in order to insure that the start trigger signal from the start comparator 67 and the stop trigger signal from the stop comparator 68 are accurate and occur in synchronism with one of such pulses.

The start trigger signal is transmitted to a start multivibrator circuit 80 and the stop trigger signal is transmitted to a stop multivibrator circuit 82 to trigger such multivibrators at the proper time. The stop and start multivibrators 80 and 82 are bistable multivibrators which are reset or "enabled" by the −0% pulse from the 0% zone pulse generator 24 which is also used to reset a bistable multivibrator in the start and stop comparators 67 and 68 depending upon the position of the first or second slope switches 84 and 86, will be discussed in greater detail with respect to FIG. 3. The slope switches 84 and 86 select whether the start comparator 67 and the stop comparator 68 produce a start trigger pulse and a stop trigger pulse, respectively, on the first or second slope of the input signal supplied to such comparators through the start and stop switches 56 and 58. The output signals from the stop and start comparators are indicated on FIGS. 5A and 5B opposite "Start Comparator" and "Stop Comparator" respectively.

The start signal output from the start multivibrator 80 is transmitted to an "AND" gate 88 as indicated on FIG. 1, which gate has four input signals. The second input signal to this AND gate is the stop signal from the stop multivibrator 82 and the third input to such AND gate is from the display time multivibrator circuit 40 which is triggered by the + and − sweep gate signals transmitted from the 0% zone pulse generator 24, as noted previously. This display time multivibrator 40 is a bistable multivibrator which has a "dead time" so that it cannot be reset for a predetermined period of time which corresponds to the display time of the counter circuit 90. During this display time, no output signal is transmitted through AND gate 88 since the + and − gate signals cannot trigger the display time multivibrator. However, when the display time multivibrator does produce a negative output signal it enables the AND gate 88 to open when the start and stop signals from the start and stop multivibrators are of the proper polarity. The fourth input to the AND gate is transmitted through selector switch 78 in the form of a plurality of narrow voltage pulse signals from either the sampling pulse generator 74 or the voltmeter clock 76 depending upon the position of such selector switch. These sampling pulses and clock pulses are indicated on FIGS. 5A and 5B, respectively, and are transmitted through the AND gate 88 only when the other input signals to such gate are all of the same negative polarity which will be discussed in greater detail with reference to FIG. 4.

The output signal of AND gate 88 is labeled "To Counter" on FIGS. 5A and 5B and is in the form of a plurality of sampling or clock pulses equal to the number of such pulses which are generated in the time between the start signal and the stop signal produced by multivibrators 80 and 82. These output signal pulses are transmitted to a binary decade counter circuit 90 indicated on FIG. 1 where the number of such pulses is determined and displayed upon indicator tubes as discussed previously. The counter circuit 90 is reset by a counter reset pulse from the display time multivibrator 40 when such multivibrator produces a negative output pulse to the AND gate. The counter circuit may include four separate counters corresponding to the units, tens, hundreds and thousands digits, respectively. The output from these individual counter circuits may be transmitted to a no-go circuit (not shown) which may be provided with a lower limit number reference voltage and an upper limit number reference voltage along with three different colored signal lights to indicate when the number of pulses counted by counter 90 is below the lower limit, between the lower and upper limit, and above the upper limit. This no-go circuit may be used for testing a plurality of similar devices against a standard such as in the manufacturing of transistors and other semiconductive devices.

The start signal from the start multivibrator 80 and the stop signal from the stop multivibrator 82 are also transmitted to the analog display circuit 30 so that they are applied to the control grid of cathode ray tube 14 to produce an intensified start-stop zone 92 of increased brightness on either or both of the "A" and "B" trace waveforms 16 and 18. In the switch positions shown in FIG. 1, the rise time of the "A" trace waveform 16 is being measured so that start-stop zone 92 appears on the first positive slope of that waveform between 10% and 90% on such slope. In order to measure the rise time of the "B" trace waveform 18, it is only necessary to switch the start switch 56 from the position shown to the next switch position of the "B SIG." and "B MEM." terminals and to move the contacts of the stop switch 58 also to "B SIG." and "B MEN." since the potentiometers 50 and 52 are already set at 90% and 10%, respectively. This will move the start-stop zone 92 down to the first positive slope on the "B" trace waveform 18. If it is desired to measure the time delay between the "A" signal and the "B" signal, it is only necessary to move the contacts of the stop switch 58 from the position shown to the "B SIG." and "B MEM." terminals and to set the movable contact of potentiometer 50 at the 50% terminal and the movable contact of potentiometer 44 on the 50% terminal. Then the start-stop zone 92 will appear on both the "A" and the "B" trace waveforms 16 and 18 extending between points on each of such waveforms which are related in time to the 50% memory voltage point on the "A" trace waveform and the 50% memory voltage point on the "B" trace waveform.

The voltage amplitude of the "A" trace waveform 16 can be determined by merely changing the position of selector switch 78 to the voltmeter clock 76 terminal and moving the positions of the start and stop switches 56 and 58 so that they are on the "V-M.R.," "A 0%" and the "V-M.R.," "A 100%" terminals, respectively, and the counter 90 records the voltage between the intensified zones 36 and 32. However, in order to measure the voltage amplitude of the B trace waveform 18 at a point on the negative portion of such waveform, it is necessary to move the start switch contacts to the "B 0%" and the "V-M.R." terminals and the stop switch contacts to the "B 100%" and the "V-M.R." terminals in addition to moving the selector switch 78 to the terminals connected to the voltmeter clock 76. The 100% zone 34 is then moved to the maximum negative voltage point on waveform 18 by varying potentiometer 28 and reversing switch 62 is moved to the − position. The counter then records the voltage from 100% zone 34 to 0% zone 38 since the start and stop switches are reversed. No provision is made for a stop-start zone during voltage measurement, corresponding to intensified zone 92, because the 0% and 100% zones indicate where such measurement is taken on the waveform.

Many different time and voltage characteristics may be measured by selecting the appropriate switch positions of the start and stop switches 56 and 58 along with the plus or minus slope switches 70 and 72, the first or second slope switches 84 and 86, reversing switches 60 and 62, and selector switch 78. Thus, it is possible to measure the pulse width of the "A" trace waveform 16 between the 50% start point on the first + slope to the 50% stop point on the first − slope, and to measure the period and thus derive the frequency of such waveform between a 20% start point on the first + slope to a 20% stop point on the second + slope which is the leading edge of the next succeeding waveform. In some cases it may be desirable to measure the time between certain discontinuities on the waveform which do not occur at the percent step positions represented on the potentiometers 43, 44, 50 and 52. When this is the case, the start and stop switches 56 and 58 are moved to the terminals "MAN." and "H.SWP." so that the start and stop points may be placed at any position on the waveforms by use of the continuously variable potentiometers 65 and 66. The voltage may be measured to any point on the waveforms because the 100% memory voltage and corresponding 100% zone for each of such waveforms may be moved to any desired position by the continuously variable potentiometers 26 and 28. It should be noted that the slope switches 70, 72, 84 and 86 remain in the first + slope switch positions on all voltage measurements because that slope on the ramp signal from the voltmeter ramp generator 64 is used as the comparison signal rather than the "A" or "B" signals from the vertical amplifier.

Figure 2:
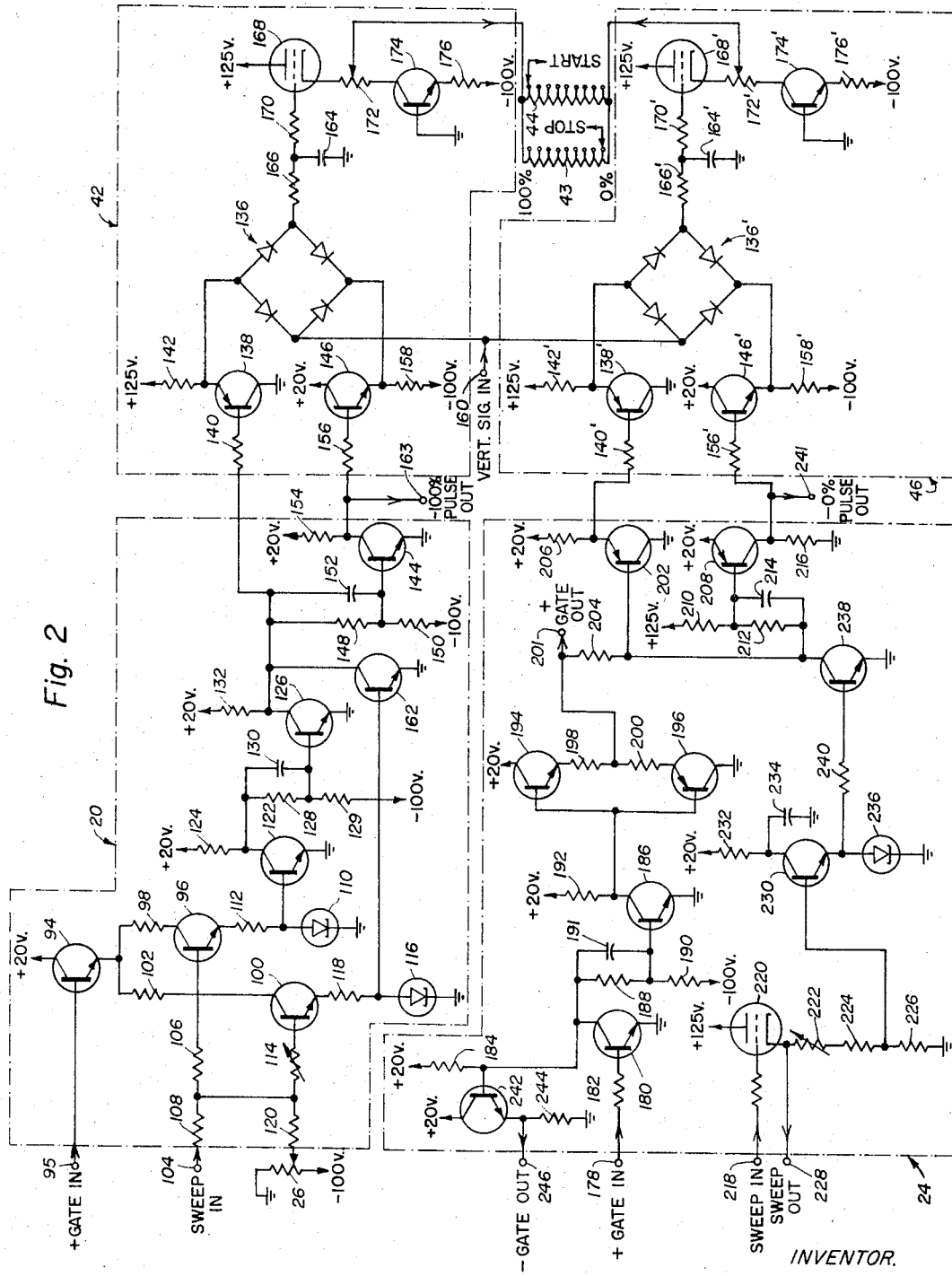
FIG. 2 is a schematic diagram of the circuits of the 0% and the "A" 100% zone pulse generator and comparator circuits and the 0% and "A" 100% gate and memory circuits of FIG. 1.

FIG. 2 shows the detailed circuits of the blocks 20, 24, 42 and 46 of the block diagram of FIG. 1. The "A" 100% zone gate pulse generator and comparator circuit 20 may include a NPN type gating transistor 94 whose base is connected to the + sweep gate signal, with its collector connected to a suitable source of positive D.C. bias voltage and its emitter connected to a pair of NPN type transistors including a first driver transistor 96 through a coupling resistor 98 and a second driver transistor 100 through a coupling resistor 102. The first driver transistor 96 has its base connected to the horizontal sweep signal at input terminal 104 through a coupling resistor 106 and a coupling resistor 108, while the emitter of such transistor is connected to the anode of a first tunnel diode 110 whose cathode is grounded, through a current limiter resistor 112. The second driver transistor 100 has its base also connected to the horizontal sweep signal at input terminal 104 through the resistor 108 and a variable coupling resistor 114, while the emitter of such transistor is connected to the anode of a second tunnel diode 116 whose cathode is grounded, through a current limiter resistor 118. Driver transistors 96 and 100 are also connected at their base electrodes to the movable contact of the 100% reference voltage potentiometer 26, previously described with respect to FIG. 1, through a dropping resistor 120. Since one end of potentiometer 26 is connected to a —100 volts D.C. voltage source and its other end is connected to ground, a negative D.C. reference voltage is transmitted through the movable contact of such potentiometer to the common connection between resistors 106 and 108. This negative D.C. 100% reference voltage biases driver transistors 96 and 100 so that they are normally nonconducting.

When the positive ramp voltage of the horizontal sweep signal is applied to input terminal 104, driver transistors 96 and 100 are rendered conducting after the sweep ramp voltage exceeds the 100% reference voltage. The amount of current flowing into these driver transistors is determined by the resistance of coupling resistors 106 and 114 which limit the base current in such transistors so that for a given sweep voltage more current flows through resistor 106 and transistor 96 than flows through resistor 114 and transistor 100. The current conduction of transistors 94, 96 and 100 determines when tunnel diodes 110 and 116 are switched from their low voltage stable condition to their high voltage stable condition since these tunnel diodes are connected as bistable multivibrators. Thus, when the + sweep gate signal is applied to the base of gating transistor 94 it renders such transistor conductive during this positive signal pulse so that current flows through such gating transistor from the positive D.C. voltage source connected at its collector, to tunnel diodes 110 and 116 when transistors 96 and 100 are also rendered conducting. Therefore, since driver transistor 96 produces more emitter current than transistor 100 for a given sweep voltage, tunnel diode 110 switches before tunnel diode 116 to produce a positive voltage pulse which is transmitted to a first NPN type common emitter amplifier transistor 122 having its base connected to the anode of tunnel diode 110, its emitter connected to ground, and its collector connected to a source of positive D.C. bias voltage through load resistor 124.

The output signal pulse of transistor 122 is transmitted to the base of a second NPN type common emitter amplifier transistor 126 through a coupling resistor 128 that forms a voltage divider with resistor 129 which is connected to a source of negative D.C. bias voltage. A bypass capacitor 130 is connected across coupling resistor 128. The emitter of transistor 126 is connected to ground and its collector connected to a source of positive D.C. bias voltage through a load resistor 132 so that the input signal applied to the base of transistor 122 is phase-inverted twice by transistors 122 and 126 and appears on the collector of the second amplifier transistor 126 as a positive voltage pulse. The positive voltage pulse at the collector of transistor 126 due to the switching of tunnel diode 110 to its higher voltage state is utilized to turn "ON" a four diode bridge memory gate 136 by applying this voltage pulse through a first emitter-follower transistor 138 to the anodes of two of the normally reversed biased diodes forming such gate. The transistor 138 may be a PNP type transistor having its base connected to the collector of the second amplifier transistor 126 through a coupling resistor 140, its collector connected to ground, and its emitter connected to a source of positive D.C. bias voltage through a load resistor 142.

The positive going voltage pulse produced by transistor 126 is transmitted to the other side of the memory gate 136 as a negative voltage pulse through an inverter transistor 144 and an emitter-follower transistor 146. The inverter transistor 144 may be an NPN type transistor whose base is connected to the collector of transistor 126 through a coupling resistor 148 which forms a voltage divider with a resistor 150 having one end connected to a source of negative D.C. bias voltage. A bypass capacitor 152 is connected in parallel with the coupling resistance 148. The emitter of inverter transistor 144 is connected to ground while the collector of such transistor is connected to a source of positive D.C. bias voltage through a load resistor 154. The emitter-follower transistor 146 may be an NPN type transistor whose base is connected to the collector of inverter transistor 144 through a coupling resistance 156, whose collector is connected to a source of positive D.C. bias voltage, and whose emitter is connected to a source of negative D.C. bias voltage through a load resistor 158. It should be noted that transistors 138 and 146 are normally conducting so that the voltage on the emitter of transistor 146 is more positive than that on the emitter of transistor 138 in order to reverse bias the diodes of memory gate 136 to render such gate normally closed.

The vertical signal from the vertical amplifier 10 is applied to the input end of the memory gate 136 at input terminal 160 so a portion of this vertical signal is transmitted through such gate when the gate opening voltage pulse produced by tunnel diode 110 is supplied to the opposite sides of the gate to forward bias the diodes comprising such gate and to open it for a short period of time until the gate closing voltage pulse from the tunnel diode 116 is applied to such bridge.

The second tunnel diode 116 is also connected as a bistable multivibrator so that it is switched from its low voltage stable state to its high voltage stable state by the current signal transmitted through transistor 100. This produces a positive voltage pulse on the anode of the second tunnel diode which is transmitted through an NPN type common emitter amplifier transistor 162 and appears as a negative voltage pulse on the collector of such transistor. This negative voltage pulse is then applied to one side of the memory gate 136 through the emitter-follower transistor 138 and to the other side of such gate through the inverter transistor 144 and the emitter-follower transistor 146 so that it reverse-biases the diodes of the memory gate 136 and causes such gate to close so that no more of the vertical signal can be transmitted therethrough. The gate-closing voltage pulse produced by tunnel diode 116 is delayed with respect to the gate opening voltage pulse produced by tunnel diode 110 by an amount determined by the setting of the variable resistor 114 whose resistance determines the amount of current transmitted to the base of transistor 100 for a given sweep voltage. The higher the resistance setting of the variable resistor 114 the less current will be transmitted to tunnel diode 116 through transistor 110 for a given sweep voltage so that it takes a higher sweep voltage to trigger tunnel diode 116 than it takes to trigger tunnel diode 110. This time delay between the production of the gate-opening voltage pulse and the gate-closing voltage pulse by tunnel diodes 110 and 116, determines the width of the "A" + and —100% pulses produced by the "A" 100% zone pulse generator 20 and transmitted to the base electrodes of transistors 138 and 146 in the "A" 100% gate and memory circuit 42. The "A" —100% zone pulse is also transmitted to the analog display circuit 30 connected at output terminal 163 to the collector of transistor 144. Also, the time at which transistor 96 is rendered conductive and the gate-opening voltage pulse produced with respect to the start of the sweep ramp voltage is determined by the setting of the 100% reference voltage potentiometer 26 since the potentiometer determines the amount of the negative D.C. reference voltage applied to the base of transistor 96 which must be overcome by the positive voltage of the sweep ramp before such transistor can be made conducting. Therefore, the setting of potentiometer 26 determines the start of the 100% pulse and the setting of the variable resistor 114 determines the width of such pulse.

That portion of the "A" vertical signal which corresponds in time to the "A" 100% pulse applied to the gate 136 is transmitted through such gate to a memory capacitor 164. One side of this memory capacitor 164 is connected to the output end of the memory gate 136 through a charging resistor 166 and to the grid of a cathode follower vacuum tube 168 through a coupling resistor 170. The other side of the memory capacitor 164 is grounded so that such capacitor stores the voltage of that portion of the vertical signal transmitted through memory gate 136 and applies this voltage to the grid of tube 168. The cathode follower tube 168 has its anode connected to a source of positive D.C. bias voltage and its cathode connected to a source of negative D.C. bias voltage through a variable potentiometer load resistor 172 connected in series with the emitter-collector circuit of a NPN type voltage regulator transistor 174 whose base is grounded and whose emitter is connected to such negative voltage source through an emitter resistor 176. The movable contact of the load potentiometer 172 is connected to 100% side of the "A" memory voltage potentiometers 43 and 44, and the setting of the load potentiometer regulates the 100% D.C. level of the "A" memory voltage.

The 0% zone gate pulse generator 24 and the zero percent gate and memory circuit 46 of FIG. 2 are similar to the 100% pulse generator 20 and the 100% gate and memory circuit 42 so that similar components will be labeled with the same numbers and only the differences will be described. Since generation of the 0% zone pulse is always related to the start of the horizontal sweep voltage ramp, the gate opening pulse for the memory gate 136' of the 0% gate and memory circuit 46 is generated by the + sweep gate signal applied to an input terminal 178 of pulse generator 24. This positive sweep gate signal is applied to the base of an NPN type input transistor 180 through a coupling resistor 182. The emitter of this transistor 180 is connected to ground and its collector is connected to a source of positive D.C. bias voltage to a load resistor 184. The + sweep gate signal is transmitted from the collector of transistor 180 to the base of an NPN type voltage amplifier transistor 186 through a coupling resistor 188 which forms part of a voltage divider with resistor 190 having one end connected to a source of negative D.C. bias voltage. A bypass capacitor 191 is provided across coupling resistor 188, and the collector of transistor 186 is connected to a source of positive D.C. bias voltage through a load resistor 192 while its emitter is grounded. The collector of transistor 186 is connected to the base electrodes of a pair of emitter follower transistors 194 and 196 having their emitter electrodes connected in common through emitter load resistors 198 and 200, respectively, at + sweep gate signal output terminal 201. Transistor 194 is an NPN type transistor whose collector is connected to a source of positive D.C. bias voltage while transistor 196 is a PNP type transistor whose collector is connected to ground so that such transistors form a current amplifier by their complementary symmetry. When the positive going portion of the + sweep gate signal is applied to the input terminal 178 it is inverted twice by transistors 180 and 186 before being transmitted through emitter follower transistors 194 and 196 to the output terminal 201 as a positive going voltage pulse.

This positive going pulse is transmitted as a gate opening pulse to one side of the memory gate 136' through a first emitter-follower transistor 202 and a second emitter-follower transistor 138'. The emitter-follower transistor 202 may be a PNP type transistor whose base is connected to the emitters of transistors 194 and 196 through a coupling resistor 204, while the collector of transistor 202 is grounded and its emitter is connected to a source of positive D.C. bias voltage through a load resistor 206. The gate opening pulse is also applied to the other side of the memory gate 136' through an inverter amplifier transistor 208 and an emitter-followed transistor 146'. The emitter of transistor 208 is connected to a source of positive D.C. bias voltage and its base to a biasing circuit in the form of a voltage divider including resistors 210 and 212 which are connected respectively to a source of positive D.C. bias voltage and the coupling resistor 204. A bypass capacitor 214 is connected across resistor 212, and the collector of transistor 208 is connected to ground through a load resistor 216. Since the positive gate opening pulse is transmitted through inverter transistor 208 before being applied to the memory gate 136' through emitter-follower transistor 146', it appears as a negative going voltage at the cathodes of the gate diodes connected to the emitter transistor 146' in order to forward bias such diodes and to open such memory gate.

The memory gate closing pulse is supplied by the horizontal sweep signal applied to an input terminal 218 of the 0% pulse generator 24. The ramp voltage of the horizontal sweep signal is applied to the grid of an input cathode follower vacuum tube 220 whose anode is connected to a source of positive D.C. plate supply voltage and whose cathode is connected to ground through a cathode load resistance including a variable resistor 222 and a pair of fixed voltage divider resistors 224 and 226. One output from the cathode follower tube 220 is taken directly off the cathode at an output terminal 228 as the horizontal sweep output signal. However, the output signal of tube 220 which produces the memory gate closing pulse is taken from across load resistor 226 and applied to the base of a NPN current driver transistor 230 whose collector is connected to a source of positive D.C. bias voltage through a load resistor 132 which is A.C. bypassed to ground through a bypass capacitor 234. The emitter of transistor 230 is connected to the anode of a tunnel diode 236 whose cathode is grounded and which is connected as a bistable multivibrator so that when driver transistor 230 produces a current pulse which is sufficient to switch the tunnel diode 236 from its low voltage to its high voltage stable state, a positive voltage gate closing pulse is produced on the anode of such tunnel diode.

This positive gate closing pulse is transmitted to the base of a common emitter amplifier transistor 238 through a coupling resistor 240. The transistor 238 may be an NPN type transistor whose emitter is grounded and whose collector is connected to the base electrodes of transistors 202 and 208 so that the positive gate closing pulse applied to the base of transistor 238 is transmitted as a negative gate closing pulse to the base of transistors 202 and 208 in order to be of the proper polarity to reverse bias and close the memory gate 136'. The setting of variable load resistor 222 determines the width of the + and −0% zone pulses produced at the emitters of transistors 142' and 146', respectively, because it controls the amount of the voltage developed across load resistor 226 for a given sweep voltage. Thus, for larger resistance settings of variable resistor 222 it takes more sweep voltage to develop sufficient output voltage across load resistor 226 to allow driver transistor 230 to cause tunnel diode 236 to switch to its higher voltage stable state. Therefore, the 0% zone pulse is generated at a time determined by the positive going portion of the + sweep gate signal which corresponds to the start of the ramp voltage of the horizontal sweep signal, and such 0% zone pulse has a width which is determined by the setting of the variable load resistor 222 since its resistance controls the time delay before the tunnel diode 236 is switched to produce the memory gate closing pulse. The −0% zone pulse which is transmitted to the analog display circuit 30 of FIG. 1 is supplied from an output terminal 241 connected to the collector of transistor 208.

Since the 0% gate and memory circuit 46 is identical to that of the 100% gate and memory circuit 42 it will not be described in detail except to note that the similar numbered elements correspond to those of circuit 42. Also, it should be noted that the + sweep gate signal is inverted by the input transistor 180 and applied to the base of an emitter-follower transistor 242 which may be an NPN type transistor whose collector is connected to a source of positive D.C. bias voltage while its emitter is connected to ground through an emitter load resistor 244 so that an inverted or − sweep gate signal can be obtained from an output terminal 246.

Figure 3:
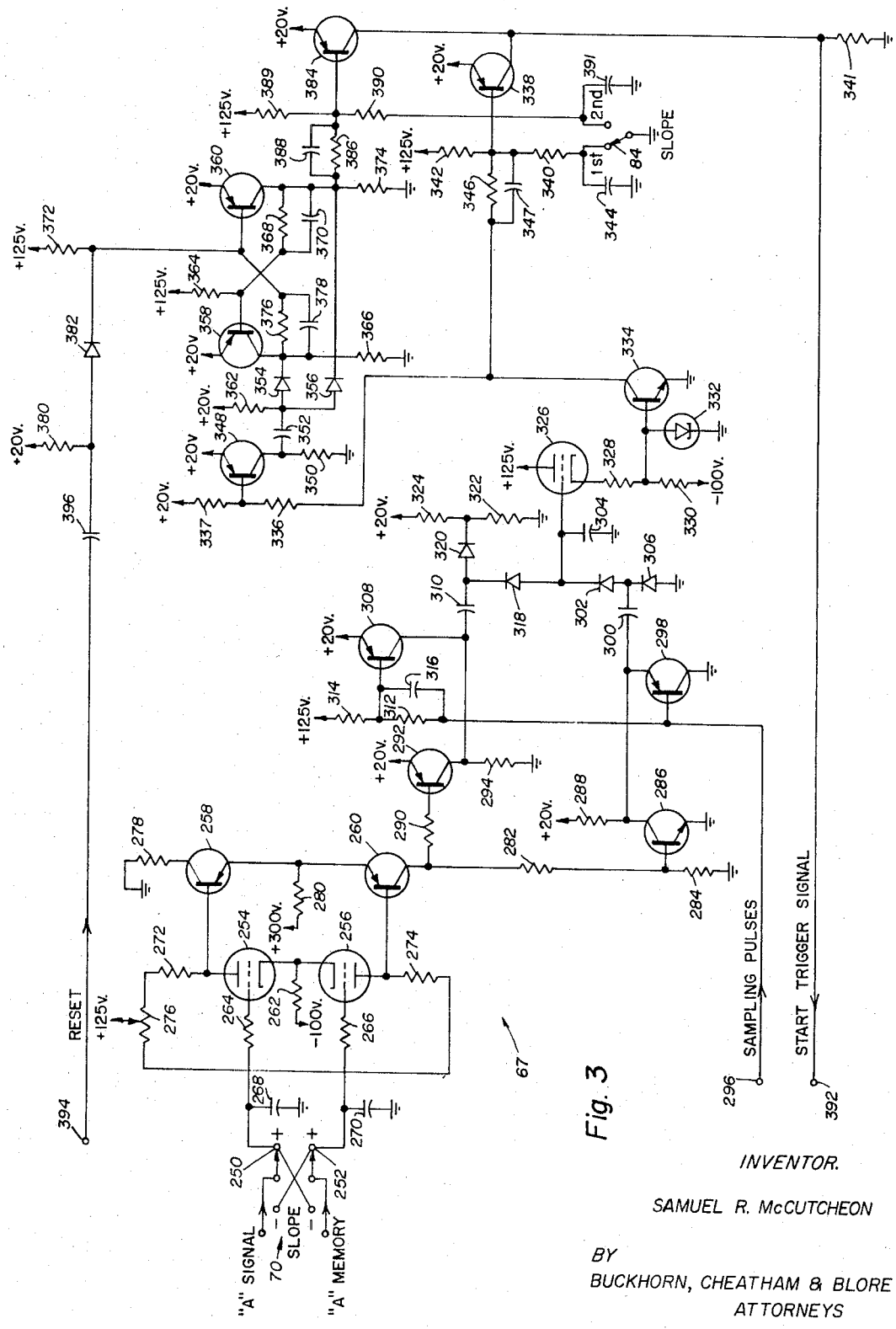
FIG. 3 is a schematic diagram of the start comparator circuit of FIG. 1.

The start comparator circuit 67 of FIG. 1 is shown in greater detail in FIG. 3 and is identical to the stop comparator circuit 68 so that the latter circuit will not be shown in detail. The input signal to the start signal comparator from the start switch 56 is transmitted through the + or − slope switch 70. In the switch positions shown in FIG. 1, the "A" signal is transmitted through an input terminal 250 and the "A" memory reference voltage is transmitted through an input terminal 252. These input signals are transmitted to a pair of difference amplifiers including first and second triode vacuum tubes 254 and 256, and first and second PNP type transistors 258 and 260. The first difference amplifier contains vacuum tubes 254 and 256, which have a common cathode connection to a source of negative D.C. bias voltage through a common bias resistor 262. The input signals are applied to the grids of tubes 254 and 256 through coupling resistors 264 and 266 connected to input terminals 250 and 252, respectively, which are A.C. bypassed to ground through bypass capacitors 268 and 270, respectively. The tubes 254 and 256 are connected at their anodes to a source of positive D.C. bias voltage through load resistors 272 and 274, respectively, which are connected in series with a variable resistance potentiometer 276, whose movable contact is connected to such source of bias voltage and may be varied in order to balance the difference amplifier. The second difference amplifier contains transistors 258 and 260 and is connected in cascade with the first difference amplifier. The output signal from the anode of the first tube 254 is applied to the base of the first transistor 258 whose collector is connected to ground through a load resistor 278 and whose emitter is connected in common with the emitter of the second transistor 260 to a source of positive D.C. bias voltage through a common bias resistor 280. The output signal from the anode of the second tube 256 is applied to the base of the second transistor 260 whose collector is connected to ground through a pair of series connected load resistors 282 and 284.

Two output signals are taken from the second difference amplifier at the collector circuit of transistor 260. One is taken across load resistor 284 and supplied as an input signal to the base of a first NPN type switching transistor 286 whose emitter is connected to ground and whose collector is connected to a source of positive D.C. bias voltage through a load resistor 288, while the second output signal is taken across both load resistors 282 and 284 and transmitted through a coupling resistor 290 to the base of a second PNP type switching transistor 292 having its emitter connected to a source of positive D.C. bias voltage and its collector connected to ground through a load resistor 294. In the switch position shown in FIG. 1, the input terminal 252 is connected to receive the positive D.C. voltage from the 10% reference voltage of the "A" memory potentiometer 44, while the input terminal 250 is connected to receive the "A" vertical signal from the vertical amplifier 10. As this vertical signal increases from zero toward the 10% reference voltage, input terminal 250 is negative with respect to input terminal 252 so that transistor 260 is conductive and the output voltage signal at the collector of such transistor is at its most positive potential. This turns "ON" switching transistor 286 and turns "OFF" switching transistor 292. However, once the vertical signal voltage increases above the 10% reference voltage applied to terminal 252, the input terminal 250 goes positive and the transistor 260 becomes nonconductive to provide a negative voltage signal on its collector which switches transistor 286 "OFF" and transistor 292 "ON." Thus either one or the other of transistors 286 and 292 are conducting, depending upon the polarity of input terminal 250 with respect to input terminal 252.

A plurality of narrow voltage pulses are applied to the signal comparator circuit of FIG. 3 through an input terminal 296 which may be connected either to the sampling pulse generator 74 or to the voltmeter clock 76 by selector switch 78. The voltage pulses applied to the terminal 296 in the switch position shown in FIG. 1 are the sampling pulses of the sampling oscilloscope. These sampling pulses are transmitted to a PNP emitter follower transistor 298 whose collector is connected to ground and whose emitter is connected to the collector of switching transistor 286 and to a coupling capacitor 300. When switching transistor 286 is conducting due to a positive signal on the collector of transistor 260, its emitter to collector circuit presents very little resistance so that the sampling pulses developed on the emitter of transistor 298 are transmitted to ground through such switching transistor. However, when switching transistor 286 is nonconducting due to a negative signal on the collector of transistor 260, the sampling pulses transmitted to the emitter of transistor 298 cannot be conducted to ground except through load resistor 288, so these positive rectangular sampling pulses are then transmitted as a differentiated signal containing positive and negative spikes through the coupling capacitor 300. This coupling capacitor is connected to the anode of a coupling diode 302 whose cathode is connected to a storage capacitor 304, which stores the positive spikes of these sampling pulses after they have been differentiated by coupling capacitor 300. The negative spike portions of the differentiated pulse signal are transmitted to ground through a clipping diode 306 whose cathode is connected to the anode of diode 302.

The sampling pulses are also transmitted to the base of common emitter amplifier transistor 308 which may be a PNP type transistor whose emitter is connected to a source of positive D.C. bias voltage and whose collector is connected to the collector of transistor 292 and to a coupling capacitor 310. The sampling pulses are transmitted through a coupling resistor 312 to the base of transistor 308 that is also connected to a source of positive D.C. bias voltage through a bias resistor 314 forming a voltage divider with resistor 312 which is shunted by a bypass capacitor 316. The sampling pulses are transmitted to the collector of transistor 308 as negative pulses due to the phase inversion of such transistor and are transmitted to ground throught he emitter to collector circuit of transistor 292 when such transistor is conducting. However, when switching transistor 292 is nonconducting due to a positive signal on the collector of transistor 260 sampling pulses are transmitted through the coupling capacitor 310 as a differentiated signal having negative and positive spike portions. The coupling capacitor 310 is connected to the cathode of a coupling diode 318 whose anode is connected to the storage capacitor 304 so that the negative spike of the differentiated sampling pulse is transmitted through the coupling diode 318 to such storage capacitor 304. The positive spike of such differentiated sampling pulse is transmitted through a clipping diode 320 whose anode is connected to the cathode of coupling diode 318 and whose cathode is connected to ground through a resistor 322 which forms a voltage divider with another resistor 324 connected to a source of positive D.C. bias voltage so that their common connection is normally biased at about +4 volts D.C. The switching voltage for each one of the diodes 302, 306, 318 and 320 is about 0.75 volt. Therefore, the voltage limits to which the storage capacitor 304 can charge are −1.5 volts and +5.5 volts, since −1.5 volts is the total voltage to ground across diodes 302 and 306 and +5.5 volts is the total voltage to ground across diodes 318 and 320 and resistor 322. The resultant signal developed on the memory capacitor is in the form of a stairstep voltage.

The stairstep voltage of the storage capacitor 304 is applied to the grid of a cathode follower amplifier vacuum tube 326 whose anode is connected to a source of positive D.C. bias voltage and whose cathode is connected to a source of negative D.C. bias voltage through a pair of series connected load resistors 328 and 330. The signal developed across load resistor 330 is applied to the anode of a tunnel diode 332 which is connected as a bistable multivibrator with its cathode connected to ground so that it is normally biased in a low voltage state. It takes at least three consecutive positive spike pulses on capacitor 304 to increase the current flow through tube 326 enough to switch the tunnel diode 332 to its high voltage stable state. Thus even if the "A" signal contains a noise signal it will not cause the tunnel diode to be triggered incorrectly because the duration of such noise signal is less than the time required for three sampling or clock pulses.

The positive step voltage produced by the tunnel diode 332 is transmitted to the base of a common emitter amplifier transistor 334 which may be an NPN type transistor whose emitter is connected to ground and whose collector is connected to a source of positive D.C. bias voltage through a pair of load resistors 336 and 337. The positive step voltage produced by the tunnel diode 332 is inverted by transistor 334 to a negative step voltage having a leading edge which corresponds in time to a point on the "A" vertical signal waveform having the same voltage as the "A" memory reference voltage applied to input terminal 252. If the first slope of this vertical signal waveform is the slope under investigation, the slope switch 84 is switched to the "1st" position shown. This connects the base of a first PNP type output transistor 338 to ground through switch 84 and a biasing resistor 340, and allows the positive D.C. bias voltage on such base to decrease to a less positive value so that such output transistor can be switched "ON" by the negative step voltage transmitted from the collector of transistor 334 in order to allow current to flow from a positive D.C. voltage source connected at the emitter of such output transistor through an output load resistor 341 connected between its collector and ground.

The D.C. bias voltage applied to the base of output transistor 338 is determined by the current flow through a voltage divider containing bias resistor 340 and a dropping resistor 342 which is connected to a source of high positive D.C. bias voltage. When slope switch 84 is in its second slope position "2nd," the bias resistor 340 is connected to ground only through a blocking capacitor 344 so that no D.C. current flows in such bias resistor and the positive bias voltage on the base electrode of the output transistor 338 is greater than the negative voltage pulse from transistor 334 so that such output transistor remains nonconducting. However, when the slope switch 84 is in the first slope position "1st," as shown, D.C. current does flow through bias resistor 340 so that the D.C. bias voltage on the base of output transistor 338 drops from that of its normal value to a much less positive voltage. When this happens, the negative voltage pulse transmitted from the collector of transistor 334 through coupling resistor 346, which is shunted by a bypass capacitor 347, can now switch "ON" the output transistor 338 so that it conducts current and produces a positive output voltage pulse across load resistor 341.

The collector of transistor 334 is also connected to the base of an inverter amplifier transistor 348 between load resistors 336 and 337. This inverter transistor 348 may be a PNP transistor having its emitter connected to a source of positive D.C. bias voltage and its collector connected to ground through a load resistor 350. The positive voltage pulse developed upon the collector of transistor 348 due to the voltage pulse produced by tunnel diode 332 is transmitted through a coupling capacitor 352 to the anodes of a pair of coupling diodes 354 and 356 whose cathodes are connected to the collectors of transistors 358 and 360, respectively, which form part of a bistable multivibrator circuit. The coupling diodes 354 and 356 are normally forward biased by having their anodes connected to a source of positive D.C. bias voltage through a bias resistor 362. Transistor 358 may be a PNP type transistor whose emitter is connected to a source of positive D.C. bias voltage and whose base is connected to a source of positive D.C. bias voltage through a bias resistor 364, while the collector of such transistor is connected to ground through a load resistor 366. A positive spike trigger signal produced by differentiation of the positive voltage pulse by capacitor 352, is transmitted through diode 354 to the collector of transistor 358 and through diode 356 to the base of transistor 358 connected in series with a coupling resistor 368 which is shunted by a bypass capacitor 370.

Similarly, transistor 360 may also be a PNP type transistor having its emitter connected to a source of positive D.C. bias voltage, its base connected to a source of positive D.C. bias voltage through a bias resistor 372, and its collector connected to ground through a load resistor 374. The positive trigger signal is applied to the collector of transistor 360 through diode 356 and to the base of transistor 360 through the diode 354 connected in series with a coupling resistor 376 which is shunted by a bypass capacitor 378. Transistor 360 of the bistable multivibrator is normally biased "OFF," or nonconducting, by a source of positive D.C. bias voltage through a bias resistor 380 and a coupling diode 382 whose cathode is connected to the base of such transistor. Therefore, when the positive trigger signal is transmitted through diodes 354 and 356, transistor 360 switches "ON" and transistor 358 switches "OFF." The multivibrator output voltage signal from the collector of transistor 360 must go in a negative direction before an output signal can be obtained across load resistor 341 connected to the collector of a second output transistor 384. Thus, a second triggering pulse is required to trigger the transistors 360 and 358 back to their original "OFF" and "ON" conditions, respectively, so that the multivibrator output voltage signal goes negative back to zero. This second triggering signal is produced by a second voltage pulse generated by tunnel diode 332 whose leading edge corresponds to a point on the second slope of the "A" vertical signal waveworm voltage is equal to that of the "A" memory reference voltage connected to terminal 252. Therefore, the storage signal of storage capacitor 348 must run up and down twice in order to switch the tunnel diode 332 through two complete cycles of bistable multivibrator switching to produce two positive trigger pulses which are transmitted to the second slope bistable multivibrator including transistors 358 and 360.

The multivibrator output signal of this second slope multivibrator is connected to the base of the second output transistor 384 through a coupling resistor 386 which is shunted by a bypass capacitor 388. This output transistor 384 is a PNP type transistor having its emitter connected to a source of positive bias voltage and its collector connected to ground through the common load resistor 341. Also, the second output transistor 384 is similar to the first output transistor 338, in that its base must be connected to ground through the slope switch 84 in the second slope position "2nd" of such switch before the positive D.C. bias voltage on such base is low enough so that transistor 384 can be triggered by the negative going portion of the multivibrator output signal. Thus, while the base of transistor 384 is normally connected to a high positive D.C. reverse bias voltage through a resistor 389 when switch 84 is in the "1st" position shown, it is connected to a low reverse bias voltage across a bias resistor 390 when such switch is in the "2nd" position. A blocking capacitor 391 similar to capacitor 344 is connected in series with resistor 394 so that no D.C. current flows through resistor 390 to ground when switch 84 is in the position shown.

Figure 4:
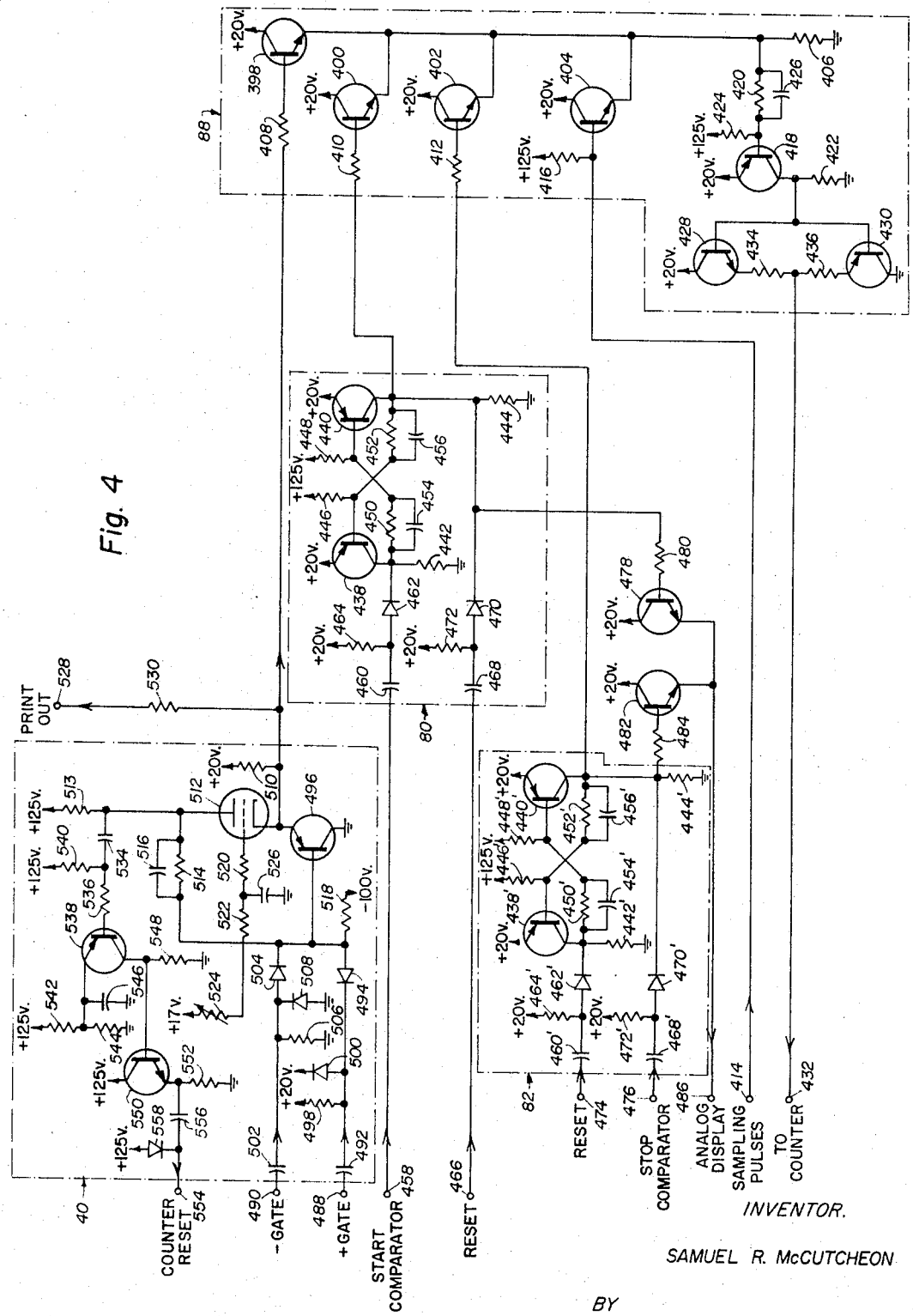
FIG. 4 is a schematic diagram of the AND gate and its associated start, stop and display time multivibrators shown in FIG. 1.

The output signal from the start signal comparator circuit 67 of FIG. 3 is obtained across the load resistor 341 at the output terminal 392. This output signal is the start trigger signal which triggers the start multivibrator 80 which is shown in FIG. 4 in greater detail. It should be noted that in some instances the second slope multivibrator including transistors 358 and 360 will not be switched back to its original operating condition so that it cannot be triggered by positive pulses. To prevent this from happening, a reset or enabling pulse is applied to the base of transistor 360 through an input terminal 394. This reset pulse may be the —0% zone pulse from the 0% pulse generator 24 which is differentiated when it is transmitted through a coupling capacitor 396 so that the positive going portion of this negative pulse produces a positive spike signal which is transmitted through the coupling diode 382 to the base of transistor 360 to switch this transistor "OFF" if it is not already nonconducting.

The detailed circuits of the start-stop logic circuit shown in FIG. 4 include those of the display time multivibrator 40, the start multivibrator 80, the stop multivibrator 82 and the AND gate 88 shown in the block diagram of FIG. 1. The AND gate circuit 88 includes four similar NPN type gating transistors 398, 400, 402 and 404 which have their emitters connected in common to ground through a common emitter load resistor 406 and each of their collectors connected to source of positive D.C. bias voltage. Gating transistor 398 has its base electrode connected to the display time multivibrator circuit 40 through a coupling resistor 408, transistor 400 is connected by its base to the start multivibrator 80 through a coupling resistor 410, and transistor 402 is connected by its base to the stop multivibrator 82 through coupling resistor 412. The remaining gating transistor 404 of the AND gate is connected by its base electrode at an input terminal 414 to a source of negative voltage pulses which may be either the sampling pulse generator 74 or the voltmeter clock 76 depending upon the position of the selector switch 78 in FIG. 1. This gating transistor 404 is biased normally conducting by a source of positive D.C. bias voltage connected to its base through a bias resistor 416. In order for the negative voltage pulses applied to the input terminal 414 to pass through the AND gate 88, all four gating transistors 398, 400, 402 and 404 must have a negative signal voltage applied to their base electrodes. These negative sampling pulses or voltmeter clock pulses are transmitted to the base of a common emitter voltage amplifier transistor 418 through a coupling resistor 420. The amplifier transistor 418 may be a PNP type transistor whose emitter is connected to a source of positive D.C. bias voltage and whose collector is connected to ground through a load resistor 422. This voltage amplifier transistor is normally biased nonconducting by means of a positive D.C. voltage source connected to its base through a biasing resistor 424, and the coupling resistor 420 is shunted by a bypass capacitor 426.

The output transistor 418 of the AND gate circuit 88 serves as a voltage amplifier to drive a current amplifier in the form of a pair of emitter follower amplifier transistors 428 and 430. Transistor 428 is an NPN type transistor while transistor 430 is a PNP type transistor in order to provide complementary symmetry for such current amplifier. The collector of transistor 428 is connected to a source of positive D.C. bias voltage and the collector of transistor 430 is connected to ground while the bases of these transistors are connected in common to the collector of transistor 418 across load resistor 422. The negative voltage sampling or clock pulses applied to the base of transistor 418 are inverted and supplied as positive voltage pulses at an output terminal 432 which is connected to the emitters of transistors 428 and 430 through emitter load resistors 434 and 436, respectively.

The start multivibrator 80 is a bistable multivibrator similar to the second slope multivibrator of the start signal comparator circuit shown in FIG. 3 including transistors 358 and 360, so it will only be described briefly. This start multivibrator includes a pair of PNP type transistors 438 and 440 whose emitters are connected to sources of positive D.C. bias voltage and whose collectors are connected to ground through load resistors 442 and 444, respectively. The base electrodes of each of these transistors 438 and 440 are connected to a source of positive D.C. bias voltage through bias resistors 446 and 448, respectively, and are each connected to the collector of the other transistor through an R.C. coupling network including coupling resistors 450 and 452 in parallel with bypass capacitors 454 and 456, respectively. The collector of transistor 438 is connected to the start comparator at an input terminal 458 through coupling capacitor 460 and a coupling diode 462 so that only the positive going portion of the start trigger signal from the start comparator 67 is transmitted through diode 462 to trigger the start multivibrator. The coupling diode 462 is forward biased by a positive D.C. voltage source connected to its anode through a bias resistor 464 which also functions as part of a differentiating network with coupling capacitor 464 for the start trigger signal.

The collector of transistor 440 is connected to a source of reset or enabling pulses at input terminal 466 which may be the —0% zone pulses generated in the 0% zone pulse generator 24 of FIG. 1. The positive going portions of these —0% pulses are transmitted through a coupling capacitor 468 and a coupling diode 470 to the collector of transistor 440 after being differentiated into negative and positive spike pulses by the R.C. network including the coupling capacitor 468 and a bias resistor 471. Bias resistor 471 is connected from a source of positive D.C. bias voltage to the anode of coupling diode 470 so that such diode is forward biased and transmits the positive spike of the —0% zone pulse which resets the transistor 440 to make such transistor normally conducting and transistor 430 normally nonconducting. Thus, when the start trigger signal is applied to the input terminal 458 of the start multivibrator 80, it causes transistor 438 to switch "ON" and transistor 440 to switch "OFF" to produce a negative going pulse across load resistor 444 which is transmitted to the base of the gating transistor 400 to render such gating transistor nonconducting.

The stop multivibrator 82 is similar to the start multivibrator 80 so that similar components have the same reference numerals, except for the fact that the —0% reset pulse is applied to the input terminal 474 and through coupling diode 462' while the stop trigger signal from the stop comparator circuit 68 of FIG. 1 is applied to the input terminal 476 and through the coupling diode 470'. Thus, transistor 438' is reset to a normally "ON" condition and transistor 440' is reset to a normally "OFF" condition so that the gating transistor 402 is normally nonconducting and a stop trigger signal transmitted to diode 470' turns "OFF" transistor 438' and turns "ON" transistor 440' to produce a positive stop signal which renders the gating transistor 402 conducting to close the AND gate 88. This is the opposite of the action of gating transistor 400 which is normally conducting due to the reset pulse and is rendered nonconducting by the start trigger signal to open the AND gate 88.

It should be noted that the load resistor 444 of the start comparator 80 is connected to the base of an emitter follower transistor 478 through a coupling resistor 480, and the load resistor 444' of the stop multivibrator circuit 82 is connected to the base of an emitter-follower transistor 482 through a coupling resistor 484. These emitter-follower transistors 478 and 482 are NPN type transistors whose collectors are each connected to sources of positive D.C. bias voltage and whose emitters are connected together in order to add the start signal generated by the start multivibrator to the stop signal generated by the stop multivibrator. This provides a stop-start signal at the output terminal 486 for the analog display circuit 30 of FIG. 1. The summing amplifier including transistor 478 and 482 may be considered to be part of the analog display circuit 30.

The input signals to the display time multivibrator circuit 40 of FIG. 4 are the + sweep gate signal applied to an input terminal 488 and the − sweep gate signal applied to an input terminal 490 from the 0% zone gate pulse generator 24. The + gate signal is transmitted through a coupling capacitor 492 and a coupling diode 494 to the base of a PNP transistor 496. The coupling diode 494 is reverse biased by a source of positive D.C. bias voltage connected to its cathode through a biasing resistor 498 which also functions as part of a differentiating network with capacitor 492 so that the + gate signal produces a positive spike signal and a negative spike signal. The positive spike signal is transmitted to ground through a clipping diode 500 whose anode is connected to the cathode of diode 494 and whose cathode is connected to a source of positive D.C. reverse bias voltage. The negative spike trigger signal is transmitted through the coupling diode 494, after being reduced in amplitude to about −3 volts by the reverse bias condition of such diode, to the base of transistor 496. In a similar manner the − sweep gate signal applied to input terminal 490 is transmitted through a coupling capacitor 502 and coupling diode 504 as a positive trigger signal to the base of the transistor 496. This − sweep gate signal is differentiated by the coupling capacitor 502 and a resistor 506 which is connected to ground so that it produces a negative spike signal and a positive spike signal. The negative spike signal is transmitted to ground through a clipping diode 508 whose cathode is connected to the anode of diode 504, while the positive spike signal is transmitted through coupling diode 504 as a +20 volt trigger signal to the base of transistor 496.

The transistor 496 of the display time multivibrator is connected as an emitter-follower amplifier with its collector grounded and its emitter connected to a source of positive D.C. bias voltage through an emitter load resistor 510. Resistor 510 is also connected as a cathode bias resistor for a triode vacuum tube 512 whose anode is connected to a source of positive D.C. voltage through a load resistor 513 and to the base of transistor 496 through a regenerative loop including an R.C. coupling network consisting of a coupling resistor 514 in parallel with a bypass capacitor 516. The base of transistor 496 is connected to the source of negative D.C. bias voltage through a bias resistor 518 so that such transistor is normally conducting to provide a path to ground for the cathode of tube 12 so that it, too, is normally conducting. When a positive trigger signal is transmitted through coupling diode 504 it switches transistor 496 "OFF" causing the cathode of tube 512 to rise to the positive voltage of the D.C. voltage source connected to resistor 510. This causes the voltage on the anode of such tube to become more positive, and this positive going voltage is coupled by the regenerative loop including coupling resistor 514 to the base of transistor 496 in order to hold such transistor cut off.

The grid of vacuum tube 512 is connected to a source of positive D.C. bias voltage through a pair of fixed resistors 520 and 522 and a variable resistor 524 connected in series. A storage capacitor 526 is connected from a point between resistors 520 and 522 to ground so that when the vacuum tube 512 becomes nonconducting this storage capacitor 526 begins to charge up towards the +17 volts of the D.C. bias voltage source connected to variable resistor 524. The effective resistance of the variable resistor 524 and fixed resistor 522 determine the charging rate of capacitor 526. When the charge on storage capacitor 526 reaches the voltage of the +17 volt source, the −3 volt negative trigger signal transmitted through the coupling diode 494 and transistor 496 to the cathode of tube 512 is sufficient to render such tube conducting since this trigger signal is seen as a +3 volt trigger signal on the grid of such tube and the total cathode to grid voltage is then approximately 0 volts. The negative trigger signal reverts the multivibrator and renders transistor 496 conducting so that the storage capacitor 526 discharges through the coupling resistor 520, the cathode to grid effective diode of tube 512, and such transistor to ground. The display time multivibrator remains in this stable state due to the regenerative action previously described until the next +20 volt trigger pulse transmitted through diode 504 renders transistor 496 and tube 512 nonconducting and again triggers the multivibrator. The display time output signal of the display multivibrator circuit 40 is transmitted to the base of the gating transistor 398 of the AND gate 88, and may also be transmitted to an auxiliary output terminal 528 through a coupling resistor 530 connected, for example, to a permanent type "print out" recorder.

When the display time multivibrator is reverted, a counter reset pulse is generated which is transmitted to the counter circuit 90 at a time corresponding to that of the discharge of storage capacitor 526. Thus a negative voltage pulse is produced across the load resistor 513 at the anode of tube 512 when such tube is rendered conducting. This negative pulse is transmitted through a coupling capacitor 534 and a coupling resistor 536 to the base of a switching transistor 538. The switching transistor 538 is a PNP type transistor whose base is connected to a source of positive D.C. bias voltage through a bias resistor 540 and the coupling resistor 536 so that such transistor is normally nonconducting. The emitter of transistor 538 is connected to a source of positive D.C. bias voltage through a resistor 542 which forms a voltage divider with a resistor 544 connected to ground. Capacitor 546 is connected from the emitter of transistor 538 to ground so that such capacitor charges to a positive D.C. voltage determined by the resistance of resistor 544 when such transistor is nonconductive. The collector of transistor 538 is connected to ground through a load resistor 548 so that, when this transistor is rendered conducting by the negative triggering signal from the anode of tube 512, the capacitor 546 discharges for a short time through such transistor and load resistor to ground to provide a positive voltage pulse which is applied to the base of an emitter-follower transistor 550. The duration of this positive pulse is determined by charging rate of capacitor 534 since the charging current increases the voltage across the capacitor until it is sufficiently positive to again cut off transistor 538. Transistor 550 is an NPN type transistor having its collector connected to a source of positive D.C. bias voltage and its emitter connected to ground through an emitter load resistor 552. The positive voltage pulse is transmitted from the emitter of transistor 550 to the pulse counter circuit 90 connected to an output terminal 554 through a coupling capacitor 556. The output terminal 554 is also connected to the cathode of the clipping diode whose anode is connected to a source of positive D.C. bias voltage in order to clip the negative spike produced by the negative going portion of the positive voltage pulse as it passes through the differentiating circuit including resistor 552 and capacitor 556 and to transmit the positive spike of such reset pulse as the counter reset pulse. It should be noted that the discharge signal of capacitor 546 is not transmitted to the anode of vacuum tube 512 through the base of transistor due to the presence of coupling resistor 536.

The waveforms of the stop-start logic circuit of FIG. 1 are shown in FIGS. 5A and 5B when the time and voltage measurements, respectively, are made on the "A" signal waveform 16 shown at the bottom of each figure. FIG. 5A shows the horizontal sweep signal 560 along with the + sweep gate signal 562 and the − sweep gate signal 564 which are triggered "ON" at the start of the horizontal sweep ramp and turned "OFF" at a time corresponding to the end of such ramp. The +0% zone pulse 566 and the −0% pulse 568 are shown as being triggered "ON" by the positive going portion of the + sweep gate signal 562 at the start of the horizontal sweep ramp 560. The +100% pulse 560 and the −100% pulse 572 are triggered ON by a voltage on the horizontal sweep ramp 560 which corresponds to the 100% reference voltage set by potentiometer 26. When measuring the rise time of the "A" trace waveform 16, the signal 574 from the start comparator 67 is triggered "ON" by the "A" signal voltage which corresponds with the 10% "A" memory reference voltage at a time related to the 10% point on the horizontal sweep ramp. The signal 576 from the stop comparator 68 is triggered by the "A" signal voltage corresponding to the 90% "A" memory reference voltage at a time related to the 90% point on the horizontal sweep ramp. The positive going portion of the start trigger signal 574 switches the start multivibrator 80 to cause its output start signal waveform 578 to go negative after it has been reset or enabled by being driven to a more positive voltage by the positive going portion of the −0% zone pulse. Similarly, the stop signal 580 from the stop multivibrator 82 is also reset or enabled to a more negative voltage by the positive going portion of the −0% zone pulse and switched in the positive direction by the positive going portion of the stop trigger signal 576.

The display time signal 582 of the display time multivibrator 40 is triggered "OFF" to a more negative voltage by the negative portion of the + sweep gate to enable the pulse counter 90 to make a count until the display time signal 582 is switched "ON" to a more positive voltage by the positive going portion of the − sweep gate signal 564. As long as the display time signal 582 is at this more positive voltage, the pulse counter can no longer be activated and the number of pulses previously counted is merely displayed on the indicator tubes of such counter. The length of this display time is determined by the setting of the variable resistor 524 of FIG. 4 which controls the "dead time" of the display time multivibrator circuit 40. When the display time signal 582 is at its more negative voltage, the sampling pulses 584 from the sampling pulse generator 74 are transmitted through the AND gate 88 to provide a counter input signal 586 between the time the start signal 578 goes negative and the time the stop signal 580 goes positive. A counter reset pulse 588 is triggered "ON" by the negative going portion of the display time signal 582 to enable the pulse counter circuit 90 to count the sampling pulses in the counter input signal 586 from the AND gate. When a time measurement is being made, the signal 590 from the analog display circuit 30 has a first positive pulse portion which corresponds to −0% zone pulse 568, a second positive pulse portion which corresponds to the start-stop time between the negative going portion of start signal 578 and the positive going portion of the stop signal 580, and a third positive pulse which corresponds in time to the −100% zone pulse 572. These first, second, and third positive pulse portions of the analog display signal 590 are shown as intensified zones 36, 92 and 32, respectively, on the A trace waveform 16.

When voltage measurements are made on the "A" signal trace 16 from the 0% zone 36 to the 100% zone 32, as shown in FIG. 5B, the same waveforms for signals 560, 562, 564, 566, 568, 570, 572, 582 and 588 are employed that are used during the time measurements of FIG. 5A. However, an additional signal from the voltmeter ramp generator 64 is also present which is the voltmeter ramp signal 592 having a positive ramp slope from +2 to +20 volts whose rate of increase is predetermined, for example 1 volt per 100 microseconds, and whose starting time may be the same as that of the horizontal sweep ramp 560. The start trigger signal 574' from the start comparator during this voltage measurement is different from that shown in FIG. 5A in that the positive going portion of such signal corresponds in time to the 0% zone voltage of, for example, −4 volts on the voltmeter ramp 592 such starting time being indicated by the mark 596 on such ramp. This start mark 596 is at about +6 volts on the voltmeter ramp 592 because the output from the vertical preamplifier forming part of the vertical amplifier 10 is +10 volts for no vertical input signal so that the 0% memory voltage is about +10 volts for 0 volts "A" signal and +6 volts for −4 volts "A" signal. It should be noted that the vertical signal applied to the cathode ray tube does not contain this +10 volts D.C. voltage because it goes through further stages of amplification. Also, the stop trigger signal 576' from the stop comparator differs from that shown in FIG. 5A because its positive going portion corresponds to the 100% zone voltage of, for example, +2 volts on the voltmeter ramp 592 indicated by the mark 598 at +12 volts on such ramp. The start signal 578' of the start multivibrator is triggered "OFF" by the positive portion of the start trigger signal 574' after being reset by the − 0% zone pulse, and the stop signal 580' from the stop multivibrator is triggered "ON" by the positive portion of the stop trigger signal 576' after being reset by the −0% zone pulse. Also, the voltage pulses counted by counter 90 now are voltmeter clock pulses 594 from the voltmeter clock 76 having a period of say 1 microsecond per pulse, and are not the sampling pulses 584. Therefore, the counter signal 586' consists of the voltmeter clock pulses 594 which are generated during the time between the negative going portion of the start signal 578' and the positive going signal of the stop signal 580'. This time would be, for example, 600 microseconds since the voltmeter ramp takes that long to increase from +6 to −12 volts. Thus 600 voltmeter clock pulses would be transmitted to the counter. Then, after placing the decimal point correctly, the counter indicator tubes would give an answer of "6.00 volts" for the voltage amplitude of the "A" signal. The analog display signal 590' may consist of a pair of positive pulse portions corresponding to the −0% zone pulse 568 and −100% zone pulse 572.

It will be obvious to those having ordinary skill in the art that many details of the electrical circuits used in the preferred embodiment of the stop-start logic circuit of the present invention may be varied without departing from the spirit of the present invention. Therefore, it is not intended to limit the scope of the present invention to the above-described preferred embodiment and this scope should be determined only by the following claims.

I claim:

1. An electrical circuit for measuring the characteristics of electrical signal waveforms displayed on the fluorescent screen of a cathode ray tube, comprising:

means for generating a start limit signal and a stop limit signal related to two different portions of said waveforms corresponding to when said waveforms reach two preset limits;

means for applying said limit signals to said cathode ray tube in order to increase the brightness of the light image of said portions of said waveforms;

means for varying the preset limit related to at least one of said limit signals in order to move the brightened portion of said waveform corresponding to said one limit signal along said waveform to any desired place on said waveform;

means for generating electrical pulses of a predetermined frequency;

means for separating some of said pulses into a group of pulses corresponding to the time interval between said start and stop signals, and relating the number of pulses in said group to a characteristic of said waveforms; and means for counting the number of pulses in said group in order to measure a characteristic of the waveform region between the two limit portions of said waveforms.

2. An electrical circuit for measuring the characteristics of electrical signal waveforms displayed on the fluorescent screen of an electron discharge display device, comprising:

means for generating a start limit signal and a stop limit signal related in time to two different preset limit portions of different ones of said waveforms;

means for applying said start and said stop signals to said display device in order to increase the brightness of the light image of said portions of said waveforms;

means for varying the preset limit related to at least one of said start and stop signals in order to move the brightened portion of said one waveform corresponding to said one signal along said one waveform to a desired place on said one waveform;

means for generating standard electrical pulses of a predetermined frequency;

means for separating some of said pulses into a group of pulses corresponding to the time interval between said start and stop signals, and relating the number of said standard pulses in said group to a characteristic of said waveforms; and means for counting the number of pulses in said group in order to measure a characteristic of the waveform region between the start portion and the stop portion of said waveforms.

3. An electrical circuit for measuring the time relationship between two electrical signal waveforms displayed on a fluorescent screen of a cathode ray tube, comprising:

means for generating a start limit signal and a stop limit signal related to two different preset limit portions of said waveforms with one of said two portions being in each of said waveforms;

means for applying said start limit and said stop limit signals to said cathode ray tube in order to increase the brightnes of the light image of said two portions of said waveforms;

means for varying the preset limit related to said limit signals in order to move the brightened portions of said waveforms along said waveforms to any desired place on said waveforms;

means for generating standard electrical pulses of a predetermined frequency gate means for transmitting a number of said pulses therethrough which correspond to the time between said limit signals; and means for counting the number of said standard pulses which are transmitted through said gate means to determine the time interval existing between the start limit portion and the stop limit portion of said waveforms.

4. An electrical circuit for measuring the time characteristics of an electrical signal waveform displayed on the fluorescent screen of a cathode ray tube, comprising:

means for generating a lower reference time signal and voltage signal and an upper reference time signal and voltage signal corresponding to two different portions of said waveform and for varying said upper reference time signal and voltage signal to change its corresponding portion of said waveform;

means for obtaining a start signal and a stop signal related to two different preset limit points on said waveform whose voltages may be varied within the range of voltages between said lower and upper reference voltage signals and whose time positions on said waveform are selected according to the different slopes of said waveform to move said points along the waveform;

means for applying said lower reference and upper reference time signals to said cathode ray tube in order to increase the brightness of the light image of said two portions of said waveform on said fluorescent screen, and for applying said start and stop signals to said tube in order to increase the brightness of that part of said waveform which lies between the two stop and start points on said waveform;

means for generating standard electrical pulses of a predetermined frequency;

means for separating some of said pulses into a group of pulses corresponding to the time interval between said start and stop signals and relating the number of said standard pulses in said group to the time characteristic of said waveform; and means for counting the number of pulses in said group in order to determine the time between said two points.

5. An electrical circuit for measuring the time characteristics of an electrical signal waveform displayed on the fluorescent screen of a cathode ray oscilloscope, comprising:

means for generating a 0% time signal and voltage signal and a 100% time signal and voltage signal corresponding to two different portions of said waveform and for varying the time of generations said 100% time pulse and voltage signal to change its corresponding portion of said waveform;

means for obtaining a start signal and a stop signal related to two different preset limit points on said waveform whose voltages may be varied within the range of voltages between said 0% and 100% voltage signals and whose time positions on said waveform are selected according to the different slopes of said waveform to move said limit points along said waveform;

means for applying said 0% and 100% time signals to the cathode ray tube of said oscilloscope in order to increase the brightness of the light image of said two portions of said waveform on said fluorescent screen, and for applying said start and stop signals to signals to said tube in order to increase the brightness of that part of said waveform which lies between the two start and stop points on said waveform;

means for generating standard signal pulses of a predetermined frequency;

means for separating some of said pulses into a group of pulses corresponding to the time interval between said start and stop signals, and relating the number of said standard pulses in said group to the time characteristic of said waveform; and means for counting the number of pulses in said group in order to determine the time between said two points.

6. An electrical circuit for measuring the time characteristics of an electrical signal sample waveform displayed on the fluorescent screen of a sampling type of cathode ray oscilloscope, comprising:

means for generating a 0% time signal and voltage signal and a 100% time signal and voltage signal corresponding to two different portions of said waveform and for varying the time of generation of said 100% time signal and voltage signal to change its corresponding portion of said waveform;

means for obtaining a start signal and a stop signal related to two different preset limit points on said waveform whose voltages may be varied within the range of voltages between said 0% and 100% voltage signals and whose time positions on said waveform are selected from the first positive, first negative, second positive and second negative slopes of said waveform to move said limit points along said waveform;

means for applying said 0% and 100% time signals to the cathode ray tube of said oscilloscope in order to increase the brightness of the light image of said two portions of said waveform on said fluorescent screen, and for applying said start and stop signals to said tube in order to increase the brightness of that part of said waveform which lies between the two start and stop points on said waveform;
means for generating sampling pulses of a predetermined frequency;
means for separating some of said pulses into a group of pulses corresponding to the time interval between said start and stop signals, and relating the number of said sampling pulses in said group to the time characteristic of said waveform; and
means for counting the number of said sampling pulses in said group in order to determine the time between said two points.

7. An electrical circuit for measuring the time characteristics of two electrical signal sample waveforms displayed on the fluorescent screen of a sampling type of cathode ray oscilloscope, comprising:
means for generating a 0% time signal and voltage signal and a 100% time signal and voltage signal for each of said two waveforms corresponding to two different portions of each of said waveforms and for varying the time of generation of said 100% time signal and voltage signal of each of said waveforms to change the corresponding portions of said waveforms;
means for obtaining a start signal and a stop signal related to two different movable preset limit points on said waveforms, one of said points being on one waveform and the other of said points being on the other waveform, whose voltages may be varied within the range of voltages between said 0% and 100% voltage signals of their corresponding waveforms and whose time positions on said waveforms are selected according to the different slopes of said waveforms to move said points along said waveforms;
means for applying said 0% and 100% time signals to the cathod ray tube of said oscilloscope in order to increase the brightness of the light image of said two portions of each of said two waveforms, and for applying said start and stop signals to said tube in order to increase the brightness of that part of said waveforms which lies between said two points;
means for generating sampling signal pulses of a predetermined frequency;
means for separating some of said pulses into a group of pulses corresponding to the time interval between said start and stop signals, and relating the number of said sampling pulses in said group to the time characteristic of said waveforms; and
means for counting the number of said sampling pulses in said group in order to determine the time between said two points.

8. An electrical circuit for measuring the voltage characteristics of an electrical signal waveform displayed on the fluorescent screen of a cathode ray tube, comprising:
means for generating a lower reference time signal and voltage signal and an upper reference time signal and voltage signal corresponding to two different portions of said waveform, and for varying the time of generation of at least one of said reference time signals to change its corresponding portion of said waveform;
means for obtaining a start signal and a stop signal related to two different preset limit points on said waveform having voltages corresponding to said lower limit voltage signal and said upper limit voltage signal by comparing said voltage signals with a standard voltage signal;
means for applying said lower and upper reference time signals to said cathode ray tube to increase the brightness of the light image of said two portions of said waveform on said fluorescent screen and to allow the brightened portion corresponding to at least one of said reference time signals to move along said waveform by said varying of the time of generation of said one signal;
means for generating clock pulses of a predetermined frequency;
means for separating some of said pulses into a group of pulses corresponding to the time interval between said start and stop signals, and relating the number of said clock pulses in said group to the voltage characteristic of said waveform through said standard voltage signal; and
means for counting the number of said clock pulses in said group in order to determine the voltage between said two points.

9. An electrical circuit for measuring the voltage characteristics of an electrical signal waveform displayed on the fluorescent screen of a cathode ray tube, comprising:
means for generating a 0% zone time signal and voltage signal and a 100% zone time signal and voltage signal corresponding to two different portions of said waveform, and for varying the time of generation of said 100% zone signal to change its corresponding portion of said waveform;
means for obtaining a start signal and a stop signal related to two different preset limit points on said waveform having voltages corresponding to said 0% voltage signal and said 100% voltage signal by comparing said voltage signals with a standard ramp voltage;
means for applying said 0% and 100% time signals to said cathode ray tube to increase the brightness of the light image of said two portions of said waveform and to allow the brightened portion corresponding to the 100% zone to move along said waveform by said varying of the time of generation of said 100% zone signal;
means for applying said start signal and said stop signal to said cathode ray tube in order to increase the brightness of that part of said waveform which lies between said two points;
means for generating clock pulses of a predetermined frequency;
means for separating some of said pulses into a group of pulses corresponding to the time interval between said start and stop signals, and relating the number of said clock pulses in said group to the voltage characteristic of said waveform through said ramp voltage; and
means for counting the number of said clock impulses in said group in order to determine the voltage between said two points.

10. An electrical circuit for measuring the voltage characteristics of an electrical signal waveform displayed on the fluorescent screen of a cathode ray oscilloscope, comprising:
means for generating a 0% zone time signal and voltage signal and a 100% zone time signal and voltage signal corresponding to two different portions on said waveform, and for varying the time of generation of said 100% zone signal to change its corresponding portion of said waveform;
means for obtaining a start signal and a stop signal related to two different preset limit points on said waveform having voltages corresponding to said 0% voltage signal and said 100% voltage signal by comparing said voltage signals with a standard voltmeter ramp voltage;
means for applying said 0% and 100% time signals to the cathode ray tube of said oscilloscope to increase the brightness of the light image of said two portions of said waveform and to allow the brightened portion corresponding to the 100% zone to move along said waveform by said varying of the time of generation of said 100% zone signal;
means for applying said start signal and said stop signal to said cathode ray tube in order to increase the brightness of that part of said waveform which lies between said two points;

means for generating voltmeter clock pulses of a predetermined frequency;

means for separating some of said pulses into a group of pulses corresponding to the time interval between said start and stop signals, and relating the number of said clock pulses in said group to the voltage characteristic of said waveform through said ramp voltage; and means for counting the number of said clock pulses in said group the start and stop points thereon in order to determine the voltage between said two points.

11. A stop-start logic circuit for determining the time between different points on an electrical signal waveform displayed by a cathode ray oscilloscope, comprising:

means for generating a 0% zone pulse and a 100% zone pulse in response to the horizontal sweep signal of said oscilloscope so that the time of generation of said 0% pulse is related to the start of said sweep signal, and the time of generation of said 100% pulse may be varied between the start of said sweep signal and the time when said sweep signal reaches its maximum amplitude;

means for producing a 0% memory voltage and a 100% memory voltage by applying the vertical signal of said oscilloscope to normally closed first and second memory gates, applying said 0% pulse to said first gate in order to open said first gate to transmit a first portion of said vertical signal through said first gate to a first storage device where it is stored as an 0% memory voltage, and applying said 100% pulse to said second gate in order to open said second gate to transmit a second portion of said vertical signal through said second gate to a second storage device where it is stored as a 100% memory voltage so that said memory voltages are related in amplitude to said portions of said vertical signal;

means for generating standard signal pulses of a predetermined frequency;

means including a start comparator circuit and a stop comparator circuit, for obtaining a start reference voltage and a stop reference voltage within the range of voltages between said 0% and 100% memory voltages, and for applying said start and stop reference voltages to said start comparator and said stop comparator, respectively, along with said vertical signal and said standard signal pulses to produce a start limit signal by said start comparator and a stop limit signal by said stop comparator which correspond to different preset limits at a start point and a stop point, respectively, on said waveform;

means for switching the connections of said comparator circuits to relate each of said start and stop signals to one of the slopes of said vertical signal including the first positive, first negative, second positive and second negative slopes thereof;

means for generating a display time output signal whose width corresponds to the time between the start and the maximum amplitude points of said sweep signal;

gate means connected so that said gate means transmits a group of said standard signal pulses only when said start signal, said stop signal and said display time signal are all of the same proper polarity so that the number of pulses in said group is related to the time between said start and stop points; and counter means for determining the number of said standard signal pulses in said group in order to measure the time between said start and stop points.

12. A stop-start logic circuit for determining the time between two different points on an electrical signal waveform displayed by a sampling type of cathode ray oscilloscope, comprising:

a pulse generator circuit for generating a 0% zone pulse and a 100% zone pulse in response to the horizontal sweep ramp signal of said oscilloscope so that the time of generation of said 0% pulse is related to the start of said sweep ramp signal, and the time of generation of said 100% pulse may be varied between the start of said sweep ramp and the time when said sweep ramp reaches its maximum amplitude by varying a reference voltage and comparing said reference voltage with said sweep ramp;

a memory circuit connected to said pulse generator circuit for producing a 0% memory voltage and a 100% memory voltage by applying the vertical signal of said oscilloscope to normally closed first and second memory gates, applying said 0% pulse to said first gate in order to open said first gate to transmit a first portion of said vertical signal through said first gate to a first storage device where it is stored as an 0% memory voltage, and applying said 100% pulse to said second gate in order to open said second gate to transmit a second portion of said vertical signal through said second gate to a second storage device where it is stored as a 100% memory voltage so that said memory voltages are related in amplitude to said portions of said vertical signal;

a sampling pulse generator device for generating sampling signal pulses;

means including a start comparator circuit and a stop comparator circuit, for obtaining a start reference voltage and a stop reference voltage within the range of voltages between said 0% and 100% memory voltages, and for applying said start and stop reference voltages to said start comparator and said stop comparator respectively, along with said vertical signal and said sampling pulses to produce a start limit signal in said start comparator and a stop limit signal in said stop comparator which correspond to different preset limits at a start point and a stop point, respectively, on said waveform;

means for switching the connection of said comparator circuits to relate each of said start and stop trigger signals to one of the slopes of said vertical signal including the first positive, first negative, second positive and second negative slopes thereof;

a start multivibrator connected to said start comparator circuit so that it produces a start signal in response to said start trigger signal;

a stop multivibrator connected to said stop comparator circuit so that it produces a stop signal in response to said stop trigger signal;

a display time multivibrator which generates a display time output signal whose width corresponds to the time between the start and the maximum amplitude points of said horizontal sweep ramp;

an AND gate connected to said start, said stop and said display time multivibrators and to said pulse generator device so that said AND gate transmits a group of said sampling pulses only when said start signal, said stop signal and said display time signal are all of the same proper polarity so that the number of pulses in said group is related to the time between said start and stop points; and a pulse counter for determining the number of said sampling pulses in said group in order to measure the time between said start and stop points.

13. A stop-start logic circuit for determining the voltage between two different points of an electrical signal waveform displayed by a cathode ray oscilloscope, comprising:

a pulse generator circuit for generating a 0% zone pulse and a 100% zone pulse in response to the horizontal sweep ramp signal of said oscilloscope so that the time of generation of said 0% pulse is related to the start of said sweep ramp signal, and the time of generation of said 100% pulse may be varied between the start of said sweep ramp and the time when said sweep ramp reaches its maximum amplitude by varying a reference voltage and comparing said reference voltage with said sweep ramp;

a memory circuit connected to said pulse generator circuit for producing a 0% memory voltage and a 100% memory voltage by applying the vertical signal of said oscilloscope to normally closed first and second memory gates, applying said 0% pulse to said first gate in order to open said first gate to transmit a first portion of said vertical signal through said first gate to a first storage device where it is stored as an 0% memory voltage, and applying said 100% pulse to said second gate in order to open said second gate to transmit a second portion of said vertical signal through said second gate to a second storage device where it is stored as a 100% memory voltage so that said memory voltages are related in amplitude to said portions of said vertical signal;

a voltmeter ramp generator for generating a voltmeter ramp signal voltage having a constant predetermined rate of increase;

a voltmeter clock pulse generator device for generating clock signal pulses;

means including a start comparator circuit and a stop comparator circuit, for obtaining a start reference voltage and a stop reference voltage corresponding to said 0% and 100% memory voltages, and for applying said start and stop reference voltages to said start comparator and said stop comparator respectively, along with said voltmeter ramp and said clock pulses to produce a start limit signal in said start comparator and a stop limit signal in said stop comparator which correspond to different preset limits at a start point and a stop point, respectively, on said waveform;

a start multivibrator connected to said start comparator circuit so that it produces a start signal in response to said start signal;

a stop multivibrator connected to said stop comparator circuit so that it produces a stop signal in response to said stop signal;

a display time multivibrator which generates an output signal whose width corresponds to the time between the start and the maximum amplitude points of said horizontal sweep ramp;

an AND gate connected to said start, said stop and said display time multivibrators and to said clock pulse generator device so that said AND gate transmits a group of said clock pulses only when said start signal, said stop signal and said display time signal are all of the same proper polarity so that the number of pulses in said group is related to the voltage between said start and stop points; and a pulse counter for determining the number of said clock pulses in said group in order to measure the voltage between said start and stop points.

14. A stop-start logic circuit for determining the time between different points on two electrical signal waveforms displayed by a sampling type of cathode ray oscilloscope, comprising:

a pulse generator circuit for generating a 0% zone pulse and a pair of 100% zone pulses, one of said pair for each of said two waveforms, in response to the horizontal sweep ramp signal of said oscilloscope so that the time of generation of said 0% pulse is related to the start of said sweep ramp signal, and the time of generation of each of said pair of 100% pulses may be varied between the start of said sweep ramp and the time when said sweep ramp reaches its maximum amplitude by varying two separate reference voltages and comparing said reference voltages with said sweep ramp;

a memory circuit connected to said pulse generator circuit for producing a 0% memory voltages and a 100% memory voltages by each of said waveforms by applying each of the vertical signals of said oscilloscope to two separate pairs of normally closed first and second memory gates, applying said 0% pulse to said first gate of each of said pairs of gates in order to open said first gate to transmit a first portion of each said vertical signals through each of said first gates to a pair of first storage devices where it is stored as an 0% memory voltage, and applying said 100% pulse to said second gate of each of said pairs of gates in order to open said second gate to transmit a second portion of each said vertical signals through each of said second gates to a pair of second storage devices where it is stored as a 100% memory voltage so that said memory voltages are related in amplitude to said portions of said vertical signals;

a sampling pulse generator device for generating sampling signal pulses;

means including a start comparator circuit and a stop comparator circuit, for obtaining a start reference voltage and a stop reference voltage within the range of voltages between said 0% and 100% memory voltages, and for applying said start and stop reference voltages to said start comparator and said stop comparator respectively, along with said vertical signals and said standard signal pulses to produce a start limit signal in said start comparator and a stop limit signal in said stop comparator which correspond to different preset limits at a start point on one of said waveforms and a stop point on the other of said waveforms;

means for switching the connections of said comparator circuits to relate each of said start and stop signals to one of the slopes of said vertical signal including the first positive, first negative, second positive and second negative slopes thereof;

a start multivibrator connected to said start comparator circuit so that it produces a start signal in response to said start signal;

a stop multivibrator connected to said stop comparator circuit so that it produces a stop signal in response to said stop signal;

a display time multivibrator which generates an output signal whose width corresponds to the time between the start and the maximum amplitude points of said horizontal sweep ramp;

an AND gate connected to said start, said stop and said display time multivibrators and to said pulse generator device so that said AND gate transmits a group of said sampling pulses only when said start signal, said stop signal and said display time signal are all of the same proper polarity so that the number of pulses in said group is related to the time between said start and stop points; and a pulse counter for determining the number of said sampling pulses in said group in order to measure the time between said start and stop points.

15. Apparatus for measuring the characteristics of electrical signal waveforms comprising:

signal generator means for generating a start limit signal and a stop limit signal related to two different portions of said waveforms corresponding to when the waveforms reach two preset limits;

selector means for selectively connecting said signal generator means to a standard voltage source whose output signal voltage increases with time in a predetermined manner or to a source of the input signals whose waveforms are being measured, for selectively relating said start and stop limit signals to the voltage difference or to the time difference between the portions of said waveforms corresponding to said limit signals to enable measurement of said voltage difference or said time difference;

control means connected to said signal generator means, for varying the preset limit related to at least one of said limit signals in order to move the point on said waveforms corresponding to said one limit signal along said waveforms to the desired portion of said waveforms;

pulse generator means for generating electrical pulses of a predetermined frequency;

gate means connected to said signal generator means and said pulse generator means, for transmitting a group of said pulses therethrough which correspond in number to the interval between said limit signals and for relating the number of said transmitted pulses to a characteristic of said waveform; and counter means connected to said gate means for counting the number of pulses in said group to determine the value of the waveform characteristic existing between the two limit portions of said waveforms.

16. Apparatus in accordance with claim 15 in which time is the waveform characteristic measured, and the signal generator means includes:

first means for deriving from said signal waveforms an upper reference voltage and a lower reference voltage and for storing said reference voltages, and second means for comparing said signal waveforms with a start limit voltage and a stop limit voltage selected from the voltage range between said reference voltages to produce said start and stop limit signals when the voltage of said signal waveforms exceed said limit voltages.

17. Apparatus in accordance with claim 15 in which voltage is the waveform characteristic measured, and the signal generator means includes:

first means for deriving from said signal waveforms an upper reference voltage and a lower reference voltage and for storing said reference voltages, second means for comparing a standard ramp voltage having a predetermined slope with said reference voltages to produce said start and stop limit signals when said ramp voltage exceeds said reference voltages, said ramp voltage being produced by said standard voltage source.

References Cited

UNITED STATES PATENTS

| | | | |
|---|---|---|---|
| 2,477,615 | 8/1949 | Isbister | 324—121 |
| 2,563,879 | 8/1951 | Soukaras | 324—68 |
| 2,575,759 | 11/1951 | Higginbotham | 324—68 |
| 2,844,790 | 7/1958 | Thompson et al. | 235—92 |
| 2,860,305 | 11/1958 | Bey et al. | 324—68 |
| 2,925,494 | 2/1960 | French et al. | 328—165 |
| 2,954,532 | 9/1960 | Pentecost et al. | 331—144 |
| 2,958,827 | 11/1960 | Anderson et al. | 328—165 |
| 2,968,009 | 1/1961 | Reeves | 331—144 |
| 3,010,071 | 11/1961 | Carlson | 324—121 |
| 3,197,700 | 7/1965 | Schwartz | 324—68 |

RUDOLPH V. ROLINEC, *Primary Examiner.*

FREDERICK M. STRADER, WALTER L. CARLSON, *Examiners.*

C. W. HOFFMAN, M. J. LYNCH, *Assistant Examiners.*

UNITED STATES PATENT OFFICE
CERTIFICATE OF CORRECTION

Patent No. 3,359,491                                December 19, 1967

Samuel R. McCutcheon

It is hereby certified that error appears in the above numbered patent requiring correction and that the said Letters Patent should read as corrected below.

Column 3, line 75, for "having" read -- have --; column 4, line 58, after "of" insert -- each of --; column 5, line 36, for " 'B'"" read -- "B" --; line 56, for "swiched" read -- switched --; line 74, after "100%" insert -- position --; column 7, line 71, for """B MEN.""" read -- "B MEM." --; column 11, line 2, for "the" read -- this --; column 14, line 58, for "throught he" read -- through the --; column 16, line 55, before "voltage" insert -- whose --; line 57, before "down" insert -- run --; column 17, line 37, after "to" insert -- a --; column 22, line 26, before "portion" insert -- going --; column 23, line 51, after "frequency" insert a semicolon; same line 51, "gate means for" should appear as the beginning of a new paragraph; column 24, line 26, for "generations" read -- generation of --; line 42, strike out "to signals"; column 25, line 39, for "cathod" read -- cathode --; column 26, line 49, for "impulses" read -- pulses --; column 27, line 13, strike out "the start and stop points thereon"; column 28, line 39, for "connection" read -- connections --; column 31 line 27, for "exceed" read -- exceeds --.

Signed and sealed this 14th day of January 1969.

(SEAL)
Attest:

EDWARD M. FLETCHER, JR.                     EDWARD J. BRENNER
Attesting Officer                             Commissioner of Patents